(12) United States Patent
Tazbaz et al.

(10) Patent No.: US 10,474,203 B2
(45) Date of Patent: Nov. 12, 2019

(54) HINGED DEVICE

(71) Applicant: Microsoft Technology Licensing, LLC, Redmond, WA (US)

(72) Inventors: Errol Mark Tazbaz, Bellevue, WA (US); David Otto Whitt, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 15/255,056

(22) Filed: Sep. 1, 2016

(65) Prior Publication Data

US 2018/0059735 A1    Mar. 1, 2018

(51) Int. Cl.
  G06F 1/16       (2006.01)

(52) U.S. Cl.
  CPC .......... G06F 1/1681 (2013.01); G06F 1/1616 (2013.01); G06F 1/1677 (2013.01); *Y10T 16/541* (2015.01)

(58) Field of Classification Search
  CPC . Y10T 16/541; Y10T 16/547; Y10T 16/5474; Y10T 16/5475; Y10T 16/5476; Y10T 16/525; Y10T 16/533; G06F 1/1681; G06F 1/1616; G06F 1/1677; G06F 1/1652; G06F 3/0346; F16C 11/12; H04M 1/022; H05K 5/0017; H05K 5/0026; E05D 3/122; E05D 3/06; E05D 11/1028; E05D 7/00; E05D 11/0054; E05D 2011/0072; E05Y 2900/606; F16M 11/10

USPC ........ 16/354, 366, 368, 369, 370, 225, 250; 361/679.27, 679.06; 455/575.3; 379/433.13; 248/919
See application file for complete search history.

(56) References Cited

U.S. PATENT DOCUMENTS

| | | | |
|---|---|---|---|
| 2,040,279 A | 5/1936 | Joseph | |
| 3,289,877 A | 12/1966 | Wolf | |
| 4,493,316 A | 1/1985 | Reed | |
| 4,617,699 A | 10/1986 | Nakamura | |
| 4,718,127 A | 1/1988 | Rittmann et al. | |

(Continued)

FOREIGN PATENT DOCUMENTS

| | | |
|---|---|---|
| CN | 1180516 A1 | 12/2004 |
| CN | 103291737 A | 9/2013 |

(Continued)

OTHER PUBLICATIONS

Final Office Action dated Feb. 5, 2018 from U.S. Appl. No. 14/47,740, 54 pages.

(Continued)

*Primary Examiner* — William L Miller
(74) *Attorney, Agent, or Firm* — Rainier Patents, P.S.

(57) ABSTRACT

The description relates to devices, such as computing devices that have hinged portions. One example can include a first portion that includes a first display and a second portion that includes a second display. This example can also include a determinative hinge assembly that rotatably secures the first and second portions around first and second hinge axes. The determinative hinge assembly can have a first unflexed configuration when the first and second portions are parallel or perpendicular to one another and a second flexed configuration when the first and second portions contact one another when oriented at an oblique angle.

19 Claims, 17 Drawing Sheets

(56) References Cited

U.S. PATENT DOCUMENTS

| | | |
|---|---|---|
| 4,753,331 A | 6/1988 | Dietenberger et al. |
| 4,845,809 A | 7/1989 | Pillifant, Jr. |
| 4,949,427 A | 8/1990 | Keller |
| 4,976,007 A | 12/1990 | Lam |
| 4,986,763 A | 1/1991 | Boyle |
| 4,996,739 A | 3/1991 | Baer |
| 5,041,818 A | 8/1991 | Liu |
| 5,173,686 A | 12/1992 | Fujihara |
| 5,229,921 A | 7/1993 | Bohmer |
| 5,448,799 A | 9/1995 | Stein, Jr. |
| 5,509,590 A | 4/1996 | Medeiros, Jr. |
| 5,566,048 A | 10/1996 | Esterberg |
| 5,606,774 A | 3/1997 | Wu |
| 5,640,690 A | 6/1997 | Kudma |
| 5,666,694 A | 9/1997 | Slow et al. |
| 5,796,576 A | 8/1998 | Kim |
| 5,987,704 A | 11/1999 | Tan |
| 5,995,373 A | 11/1999 | Nagai |
| 6,108,868 A | 8/2000 | Lin |
| 6,223,393 B1 | 5/2001 | Knopf |
| 6,301,489 B1 | 10/2001 | Winstead |
| 6,416,027 B1 | 7/2002 | Hart |
| 6,421,235 B2 | 7/2002 | Ditzik |
| 6,577,496 B1 | 6/2003 | Gioscia et al. |
| 6,628,244 B1 | 9/2003 | Hirosawa |
| 6,766,561 B1 | 7/2004 | Cheng |
| 6,778,381 B1 | 8/2004 | Bolognia et al. |
| 6,813,143 B2 | 11/2004 | Makela |
| 6,925,684 B2 | 8/2005 | Kang |
| 7,058,433 B2 | 6/2006 | Carpenter |
| 7,127,776 B2 | 10/2006 | Park |
| 7,155,266 B2 | 12/2006 | Stefansen |
| 7,266,864 B2 | 9/2007 | Kim |
| 7,293,380 B2 | 11/2007 | Repecki |
| 7,328,481 B2 | 2/2008 | Barnett |
| 7,345,872 B2 | 3/2008 | Wang |
| 7,380,312 B2 | 6/2008 | Ge et al. |
| 7,407,202 B2 | 8/2008 | Ye et al. |
| 7,414,834 B2 | 8/2008 | Ukonaho et al. |
| 7,418,766 B2 | 9/2008 | Nelson et al. |
| 7,436,674 B2 | 10/2008 | Barsun et al. |
| 7,515,406 B2 | 4/2009 | Kee |
| 7,515,707 B2 | 4/2009 | Ka et al. |
| 7,584,524 B2 | 9/2009 | Hung |
| 7,596,358 B2 | 9/2009 | Takagi |
| 7,596,395 B2 * | 9/2009 | Gartrell ............... G06F 1/1616 |
| | | 379/433.13 |
| 7,636,985 B2 | 12/2009 | Greenbank |
| 7,753,331 B2 | 7/2010 | Tang |
| 7,758,082 B2 | 7/2010 | Weigel et al. |
| 7,832,056 B2 | 11/2010 | Kuwajima et al. |
| 7,900,323 B2 | 3/2011 | Lin |
| 7,936,559 B2 | 5/2011 | Chen |
| 7,966,694 B2 | 6/2011 | Estlander |
| 7,966,698 B2 | 6/2011 | Barnett |
| 8,032,988 B2 | 10/2011 | Lai et al. |
| 8,050,021 B2 | 11/2011 | Grady et al. |
| 8,122,970 B2 | 2/2012 | Palen |
| 8,170,630 B2 | 5/2012 | Murayama et al. |
| 8,405,978 B2 | 3/2013 | Okutsu |
| 8,441,791 B2 | 5/2013 | Bohn et al. |
| 8,451,601 B2 | 5/2013 | Bohn et al. |
| 8,474,101 B2 | 7/2013 | Wang et al. |
| 8,498,100 B1 * | 7/2013 | Whitt, III ............ G06F 1/1618 |
| | | 361/679.17 |
| 8,522,401 B2 | 9/2013 | Jin |
| 8,578,561 B2 | 11/2013 | Chuang |
| 8,615,848 B2 | 12/2013 | Mitsui |
| 8,624,844 B2 | 1/2014 | Behar et al. |
| 8,638,546 B2 | 1/2014 | Hoshino |
| 8,649,166 B2 | 2/2014 | Wu |
| 8,665,382 B1 | 3/2014 | Sugimoto et al. |
| 8,687,354 B2 | 4/2014 | Uchiyama et al. |
| 8,713,759 B2 | 5/2014 | Cai |
| 8,776,319 B1 | 7/2014 | Chang et al. |
| 8,780,570 B2 | 7/2014 | Bohn et al. |
| 8,787,016 B2 | 7/2014 | Rothkopf et al. |
| 8,804,324 B2 | 8/2014 | Bohn et al. |
| 8,826,495 B2 | 9/2014 | Jauvtis et al. |
| 8,833,554 B2 | 9/2014 | Busri |
| 8,854,834 B2 | 10/2014 | O'Connor et al. |
| 8,855,726 B2 | 10/2014 | Ozawa |
| 8,875,349 B2 | 11/2014 | Hanigan |
| 8,908,364 B2 | 12/2014 | Tsang et al. |
| 8,908,365 B2 * | 12/2014 | Walters ................ G09F 19/00 |
| | | 312/319.2 |
| 8,923,934 B2 | 12/2014 | Chol et al. |
| 8,938,856 B1 | 1/2015 | Shin et al. |
| 8,959,714 B2 | 2/2015 | Hsu |
| 8,971,029 B2 | 3/2015 | Wong et al. |
| 8,978,206 B2 | 3/2015 | Hsu et al. |
| 8,982,542 B2 | 3/2015 | Bohn |
| 8,988,876 B2 | 3/2015 | Corbin |
| 9,003,607 B1 | 4/2015 | Hsu |
| 9,009,919 B1 | 4/2015 | Chiang |
| 9,013,867 B2 | 4/2015 | Becze |
| 9,014,381 B2 | 4/2015 | Quan et al. |
| 9,069,531 B2 | 6/2015 | Bohn et al. |
| 9,103,147 B1 | 8/2015 | Chuang |
| 9,104,381 B2 | 8/2015 | Kuramochi |
| 9,122,455 B2 | 9/2015 | Meyers |
| 9,185,815 B2 | 11/2015 | Hsu |
| 9,201,464 B2 | 12/2015 | Uchiyama et al. |
| 9,243,432 B2 | 1/2016 | Lee |
| 9,290,976 B1 | 3/2016 | Horng |
| 9,310,850 B2 | 4/2016 | Hsu |
| 9,317,243 B2 | 4/2016 | Becze |
| 9,348,450 B1 | 5/2016 | Kim |
| 9,371,676 B2 | 6/2016 | Rittenhouse |
| 9,411,365 B1 | 8/2016 | Tanner et al. |
| 9,417,663 B2 | 8/2016 | Kinoshita et al. |
| 9,430,000 B2 | 8/2016 | Hood, III et al. |
| 9,500,013 B2 | 11/2016 | Senatori |
| 9,507,388 B1 | 11/2016 | Hampton et al. |
| 9,513,672 B2 * | 12/2016 | Garelli ................ G06F 1/203 |
| 9,523,226 B1 | 12/2016 | Lam et al. |
| 9,524,000 B2 | 12/2016 | Hsu et al. |
| 9,569,002 B2 * | 2/2017 | Walker ................ G06F 1/1616 |
| 9,600,036 B2 | 3/2017 | Uchiyama et al. |
| 9,624,703 B1 | 4/2017 | Lin |
| 9,625,947 B2 | 4/2017 | Lee et al. |
| 9,625,953 B2 | 4/2017 | Bitz et al. |
| 9,625,954 B2 | 4/2017 | Campbell et al. |
| 9,684,343 B2 | 6/2017 | Tazbaz |
| 9,714,533 B2 | 7/2017 | Kuramochi |
| 10,227,808 B2 | 3/2019 | Kabir et al. |
| 10,241,548 B2 | 3/2019 | Mark et al. |
| 10,253,804 B2 | 4/2019 | Daniel et al. |
| 2002/0147026 A1 | 10/2002 | Hsieh |
| 2003/0179880 A1 | 9/2003 | Pan et al. |
| 2004/0091101 A1 | 5/2004 | Park |
| 2004/0212956 A1 | 10/2004 | Kuivas et al. |
| 2004/0226138 A1 | 11/2004 | Harmon et al. |
| 2004/0266239 A1 | 12/2004 | Kurokawa |
| 2005/0018393 A1 | 1/2005 | Kuo |
| 2005/0122671 A1 | 6/2005 | Homer |
| 2005/0148375 A1 | 7/2005 | DeLine |
| 2005/0155182 A1 | 7/2005 | Han et al. |
| 2005/0239520 A1 * | 10/2005 | Stefansen ............ H04M 1/022 |
| | | 455/575.1 |
| 2006/0005356 A1 | 1/2006 | Amano et al. |
| 2006/0007648 A1 | 1/2006 | Wang |
| 2006/0046792 A1 | 3/2006 | Hassemer et al. |
| 2006/0059659 A1 | 3/2006 | Kim |
| 2006/0133052 A1 * | 6/2006 | Harmon ................ G06F 1/1616 |
| | | 361/752 |
| 2006/0179612 A1 | 8/2006 | Oshima et al. |
| 2007/0101541 A1 | 5/2007 | Yin et al. |
| 2007/0117600 A1 * | 5/2007 | Robertson, Jr. ..... H04M 1/0216 |
| | | 455/575.3 |
| 2008/0112113 A1 | 5/2008 | Sawadski et al. |
| 2008/0174089 A1 | 7/2008 | Ekberg |
| 2008/0184530 A1 | 8/2008 | Chao |
| 2008/0239672 A1 | 10/2008 | Ghoshal |

(56) References Cited

U.S. PATENT DOCUMENTS

| | | |
|---|---|---|
| 2008/0250604 A1 | 10/2008 | Chen et al. |
| 2009/0070961 A1 | 3/2009 | Chung et al. |
| 2009/0104949 A1 | 4/2009 | Sato et al. |
| 2009/0291719 A1 | 11/2009 | Christensen |
| 2010/0205777 A1 | 8/2010 | Kim |
| 2010/0207844 A1 | 8/2010 | Manning |
| 2010/0232100 A1 | 9/2010 | Fukuma et al. |
| 2010/0328250 A1 | 12/2010 | Gorsica et al. |
| 2011/0099756 A1 | 5/2011 | Chen |
| 2011/0115713 A1 | 5/2011 | Altman |
| 2011/0128216 A1 | 6/2011 | Renwick |
| 2011/0177850 A1 | 7/2011 | Griffin et al. |
| 2011/0205695 A1 | 8/2011 | Hassemer et al. |
| 2011/0292605 A1 | 12/2011 | Chen |
| 2012/0002360 A1 | 1/2012 | Seo et al. |
| 2012/0037047 A1 | 2/2012 | Moldovan |
| 2012/0046076 A1 | 2/2012 | Masser et al. |
| 2012/0120618 A1 | 5/2012 | Bohn |
| 2012/0120627 A1 | 5/2012 | O'Connor et al. |
| 2012/0127471 A1 | 5/2012 | Urushidani |
| 2012/0137471 A1 | 6/2012 | Kujala |
| 2012/0162866 A1 | 6/2012 | Bohn et al. |
| 2012/0170243 A1 | 7/2012 | Griffin et al. |
| 2012/0206864 A1 | 8/2012 | Bohn et al. |
| 2012/0206893 A1 | 8/2012 | Bohn et al. |
| 2012/0257368 A1 | 10/2012 | Bohn et al. |
| 2012/0307472 A1 | 12/2012 | Bohn et al. |
| 2012/0314399 A1 | 12/2012 | Bohn |
| 2012/0314400 A1 | 12/2012 | Bohn et al. |
| 2013/0010405 A1 | 1/2013 | Rothkopf et al. |
| 2013/0016489 A1 | 1/2013 | Yeh et al. |
| 2013/0016492 A1 | 1/2013 | Wang et al. |
| 2013/0046492 A1 | 2/2013 | Westergaard |
| 2013/0111704 A1 | 5/2013 | Mitsui |
| 2013/0135809 A1 | 5/2013 | Uchiyama et al. |
| 2013/0139355 A1 | 6/2013 | Lee |
| 2013/0152342 A1 | 6/2013 | Ahn |
| 2013/0318746 A1 | 12/2013 | Kuramochi |
| 2013/0322004 A1 | 12/2013 | Park |
| 2013/0342094 A1* | 12/2013 | Walters .................. G09F 19/00 312/319.2 |
| 2014/0042293 A1 | 2/2014 | Mok et al. |
| 2014/0126133 A1 | 5/2014 | Griffin et al. |
| 2014/0129739 A1 | 5/2014 | King |
| 2014/0174227 A1 | 6/2014 | Hsu et al. |
| 2014/0185215 A1* | 7/2014 | Whitt, III ................. G06F 1/16 361/679.4 |
| 2014/0185220 A1* | 7/2014 | Whitt, III ............. G06F 1/1669 361/679.17 |
| 2014/0196253 A1 | 7/2014 | Song et al. |
| 2014/0217875 A1 | 8/2014 | Park et al. |
| 2014/0246354 A1 | 9/2014 | Probst et al. |
| 2014/0265295 A1 | 9/2014 | Rhyner et al. |
| 2014/0287804 A1 | 9/2014 | Bohn et al. |
| 2014/0290008 A1 | 10/2014 | Hsu |
| 2014/0290009 A1 | 10/2014 | Kasai et al. |
| 2014/0293534 A1 | 10/2014 | Siddiqui |
| 2014/0360296 A1 | 12/2014 | Hsu |
| 2014/0362507 A1 | 12/2014 | Kinoshita et al. |
| 2014/0373338 A1 | 12/2014 | O'Connor et al. |
| 2015/0016040 A1 | 1/2015 | Hood, III et al. |
| 2015/0020351 A1 | 1/2015 | Lin |
| 2015/0092337 A1 | 4/2015 | Tan et al. |
| 2015/0153787 A1 | 6/2015 | Mok et al. |
| 2015/0154437 A1 | 6/2015 | Aoki et al. |
| 2015/0176317 A1 | 6/2015 | Lee |
| 2015/0184437 A1 | 7/2015 | Wikander et al. |
| 2015/0227175 A1 | 8/2015 | Motosugi |
| 2015/0241978 A1 | 8/2015 | Lombardi et al. |
| 2015/0267450 A1 | 9/2015 | Chiang |
| 2015/0277506 A1 | 10/2015 | Cheah et al. |
| 2015/0309539 A1 | 10/2015 | Kamphuis et al. |
| 2015/0345195 A1 | 12/2015 | Park |
| 2015/0361696 A1 | 12/2015 | Tazbaz |
| 2015/0362956 A1 | 12/2015 | Tazbaz |
| 2015/0362958 A1 | 12/2015 | Shang |
| 2016/0041589 A1 | 2/2016 | Tazbaz |
| 2016/0070310 A1 | 3/2016 | Holung et al. |
| 2016/0083988 A1 | 3/2016 | Hsu |
| 2016/0109908 A1* | 4/2016 | Siddiqui ............... G06F 1/1618 361/679.27 |
| 2016/0132075 A1 | 5/2016 | Tazbaz |
| 2016/0132076 A1 | 5/2016 | Bitz et al. |
| 2016/0147267 A1 | 5/2016 | Campbell et al. |
| 2016/0153222 A1 | 6/2016 | Hu |
| 2016/0187934 A1 | 6/2016 | Lee et al. |
| 2016/0187935 A1 | 6/2016 | Tazbaz et al. |
| 2016/0201367 A1 | 7/2016 | Kato |
| 2016/0215541 A1 | 7/2016 | Tazbaz et al. |
| 2016/0224072 A1 | 8/2016 | Huang et al. |
| 2016/0266615 A1 | 9/2016 | Uchiyama et al. |
| 2016/0299537 A1* | 10/2016 | Whitt, III .............. G06F 1/1681 |
| 2016/0326786 A1 | 11/2016 | Lee |
| 2016/0357226 A1 | 12/2016 | Campbell et al. |
| 2017/0017273 A1 | 1/2017 | Weldon et al. |
| 2017/0090523 A1 | 3/2017 | Tazbaz et al. |
| 2017/0145724 A1 | 5/2017 | Siddiqui |
| 2017/0145725 A1 | 5/2017 | Siddiqui |
| 2018/0059735 A1* | 3/2018 | Tazbaz .................. G06F 1/1681 |
| 2018/0066465 A1 | 3/2018 | Tazbaz et al. |
| 2018/0164855 A1 | 6/2018 | Tazbaz et al. |
| 2018/0166842 A1 | 6/2018 | Siddiqui |
| 2018/0209473 A1 | 7/2018 | Park et al. |
| 2018/0230724 A1 | 8/2018 | Lin et al. |
| 2018/0292860 A1 | 10/2018 | Siddiqui |
| 2018/0356858 A1 | 12/2018 | Siddiqui et al. |
| 2018/0363341 A1 | 12/2018 | Siddiqui et al. |
| 2019/0094917 A1 | 3/2019 | Schmelzle et al. |

FOREIGN PATENT DOCUMENTS

| | | |
|---|---|---|
| CN | 203376667 U | 1/2014 |
| CN | 104331124 A | 2/2015 |
| CN | 204610543 U | 9/2015 |
| EP | 0928092 A2 | 7/1999 |
| EP | 1422593 A1 | 5/2004 |
| EP | 2466420 A1 | 6/2012 |
| EP | 2528307 A1 | 11/2012 |
| EP | 2797296 A2 | 10/2014 |
| GB | 2008940 A | 6/1979 |
| JP | 2006112523 A | 4/2006 |
| WO | 2007/072124 A1 | 6/2007 |
| WO | 2010/076639 A2 | 7/2010 |
| WO | 2010/093139 A2 | 8/2010 |
| WO | 2015/073020 A1 | 5/2015 |
| WO | 2015/147885 A1 | 10/2015 |
| WO | 2015/179257 A1 | 11/2015 |
| WO | 2017087343 A1 | 5/2017 |

OTHER PUBLICATIONS

International Preliminary Report on Patentability dated Jan. 23, 2018 from PCT Patent Application No. PCT/US2016/061940, 10 pages.

International Report on Patentability dated Jan. 18, 2018 from PCT Patent Application No. PCT/US2016/061942, 10 pages.

Non-Final Office Action dated Jun. 9, 2017 from U.S. Appl. No. 15/256,302, 17 pages.

Smith, Dania, "Microsoft Helps HP Design New Convertible Spectre x360", published Mar. 3, 2015, retrieved at <<http://blog.partspeople.com/2015/03/03/microsoft-helps-hp-design-new-convertible-spectre-x360/>>, 1 page.

"360 deg Hinge Video", published Jul. 21, 2013, retrieved at <<https://www.youtube.com/watch?v=lhEczMi4nsw>> on Aug. 17, 2016, 1 page.

"Special Purpose Hinges (cont.)", published Jan. 4, 2007, retrieved at <<http://hingedummy.info/specialpurposepage2.htm>> on Aug. 17, 2016, 2 pages.

"Acer Unveils Industry's First Convertible Chromebook with 13-inch Display," Aug. 31, 2016, retrieved at <<http://www.acer.com/ac/en/US/press/2016/202372>>, 2 pages.

(56) References Cited

OTHER PUBLICATIONS

"Asus Transformer Book Flip TP200SA 360-Degree Convertible Laptop With Quad-core Processor", published Oct. 18, 2015, retrieved from << http://www.tipandtrick.net/asus-transformer-book-flip-tp200sa-360-degree-convertible-laptop-full-review/>> on Oct. 26, 2015, 3 pages.
"BESTEK® 10"-15" Laptop/Notebook Cooling Pad Six-level Changeable Stand with Dual 118mm Hydraulic Fan Dual USB 2.0 360 degree Rotatable Base BTCPZ4BL", published Nov. 20, 2014, retrieved from <<http://www.amazon.com/Notebook-Six-level-Changeable-Hydraulic-Rotatable/dp/B00L8IF6W0>> on Aug. 31, 2015, 5 pages.
Brown, Michael, "Dell targets younger audience with 360-degree laptops and thin, light All-in-One PCs", retrieved from <<http://www.pcworld.com/article/2304649/dell-targets-younger-audience-with-360-degree-laptops-and-thin-light-all-in-one-pcs.htm>>, published Jun. 2, 2014, 7 pages.
"Computex: Asus Transformer Book Flip series launched with 360 Degree Hinge", published Jun. 3, 2014, retrieved from <<http://tech.firstpost.com/news-analysis/computex-asus-transformer-book-flip-series-launched-with-360-degree-hinge-225064.html>> on Aug. 28, 2015, 4 pages.
Domingo, Joel Santo, "Laptop, Tablet or Both? How to Decide," retrieved from <<http://in.pcmag.com/laptops/64076/feature/laptop-tablet-or-both-how-to-decide>>, published May 1, 2014, 11 pages.
Hinckley et al., "Codex: A Dual Screen Tablet Computer", In Proceedings of the SIGCHI Conference on Human Factors in Computing Systems, Boston, MA, CHI 2009—New Mobile Interactions, Apr. 9, 2009, pp. 1933-1942, 10 pages.
"HP Spectre introduce hybrid x360 laptop, rotate 360 degrees, $900", published Apr. 25, 2015, retrieved from <<http://sharetech.biz/hp-spectre-introduce-hybrid-x360-laptop-rotate-360-%E2%80%8B%E2%80%8Bdegrees-900/>> on Oct. 26, 2015, 4 pages.
Kravitz, Noah, "Kyocera Echo Unboxing—Dual-Screen Android Phone (video)", published Apr. 13, 2011, retrieved from <<http://www.technobuffalo.com/videos/kyocera-echo-unboxing-dual-screen-android-phone-video/>> on Oct. 26, 2015, 7 pages.
Pradeep, "HP Announces New Pavilion x360 Convertible Laptop Inspired by Lenovo Yoga, Price Starts at $400", published Feb. 23, 2014, retrieved from <<http://microsoft-news.com/hp-announces-new-pavilion-x360-convertible-laptop-inspired-by-lenovo-yoga-price-starts-at-400/>> on Oct. 26, 2015, 9 pages.
Smith, Daria, "Lenovo's New Flex 3 Convertible Laptops Sport a 360 Degree Hinge", retrieved from <<http://blog.parts-people.com/2015/05/13/lenovos-new-flex-3-convertible-laptops-sport-a-360-degree-hinge/>>, published May 13, 2015, 2 pages.
Smith, Sherri L., "Toshiba Satellite Radius Folds into 5 Different Modes", published May 27, 2014, retrieved at <<http://blog.laptopmag.com/toshiba-satellite-radius-specs-price>> on Sep. 1, 2015, 4 pages.
Villa, Jason de, "iPad mini case review: The best generic case you can get right now", published Jan. 1, 2013, retrieved from <<http://technoodling.net/ipad-mini-case-review-the-best-generic-case-you-can-get-right-now/>> on Aug. 28, 2015, 12 pages.
Wang, Harry, "The 360 Degrees (and 25,000 Hinge Tests) of Yoga Design," Dec. 5, 2012, retrieved at <<http://blog.lenovo.com/en/blog/the-360-degrees-of-yoga-design>>, 14 pages.
"Double geared hinge", retrieved at <<http://www.wamungo.com/PrintModel/Detail/Double-geared-hinge-5305a74589702816c05d1ab5>>, on Mar. 10, 2017, 6 pages.
Moving Point Hinge-Multipivot Hinge, retrieved at: <<http://websystem.gismo.se/Gismo/files/1029/2.mph%2001%20introduktion.pdf>> on Oct. 9, 2014, 6 pages.
Elliott, Amy-Mae, "9 Nifty Laptop Feet to Keep Your PC Running Cool", published on Jul. 30, 2012, retrieved at <<http://mashable.com/2012/07/30/laptop-feet/>>, 26 pages.
Martin, Harlan, "Geared Hinge", published on Jan. 27, 2015, retrieved at <<https://www.thingiverse.com/make:116451>> on Aug. 9, 2017, 1 page.

Non-Final Office Action dated Feb. 9, 2017 from U.S. Appl. No. 14/947,740, 35 pages.
Response filed Apr. 13, 2017 to the Non-Final Office Action dated Feb. 9, 2017 from U.S. Appl. No. 14/947,740, 9 pages.
International Search Report and Written Opinion dated Feb. 20, 2017 from PCT Patent Application No. PCT/US2016/061940, 13 pages.
Non-Final Office Action dated Nov. 3, 2016 from U.S. Appl. No. 14/947,994, 25 pages.
Response filed Jan. 11, 2017 to the Non-Final Office Action dated Nov. 3, 2016 from U.S. Appl. No. 14/947,994, 12 pages.
Final Office Action dated Feb. 16, 2017 from U.S. Appl. No. 14/947,994, 13 pages.
Response filed Apr. 3, 2017 to the Final Office Action dated Feb. 16, 2017 from U.S. Appl. No. 14/947,994, 9 pages.
Applicant-Initiated Interview Summary dated Apr. 4, 2017 from U.S. Appl. No. 14/947,994, 3 pages.
"International Search Report & Written Opinion Issued in PCT Application No. PCT/US2018/013036", dated Apr. 6, 2018, 11 Pages.
Non-Final Office Action dated Jul. 17, 2017 from U.S. Appl. No. 14/947,994, 23 pages.
International Search Report and Written Opinion dated Feb. 16, 2017 from PCT Patent Application No. PCT/US2016/061942, 12 pages.
Non-Final Office Action dated Apr. 12, 2016 from U.S. Appl. No. 14/555,184, 32 pages.
Response filed Jun. 29, 2016 to the Non-Final Office Action dated Apr. 12, 2016 from U.S. Appl. No. 14/555,184, 10 pages.
Notice of Allowance dated Jul. 14, 2016 from U.S. Appl. No. 14/555,184, 15 pages.
Corrected Notice of Allowability dated Aug. 4, 2016 from U.S. Appl. No. 14/555,184, 16 pages.
Notice of Allowance dated Oct. 24, 2016 from U.S. Appl. No. 14/555,184, 11 pages.
Corrected Notice of Allowability dated Oct. 31, 2016 from U.S. Appl. No. 14/555,184, 6 pages.
Corrected Notice of Allowability dated Nov. 21, 2016 from U.S. Appl. No. 14/555,184, 6 pages.
Corrected Notice of Allowability dated Dec. 14, 2016 from U.S. Appl. No. 14/555,184, 6 pages.
Notice of Allowance dated Feb. 3, 2017 from U.S. Appl. No. 14/555,184, 18 pages.
Corrected Notice of Allowability dated Mar. 16, 2017 from U.S. Appl. No. 14/555,184, 8 pages.
International Search Report dated Jan. 25, 2016 from PCT Patent Application No. PCT/US2015/060959, 11 pages.
Article 34 Demand filed Jun. 8, 2016 from PCT Patent Application No. PCT/US2015/060959, 14 pages.
Second Written Opinion dated Oct. 10, 2016 from PCT Patent Application No. PCT/US2015/060959, 7 pages.
Response filed Dec. 7, 2016 to the Second Written Opinion dated Oct. 10, 2016 from PCT Patent Application No. PCT/US2015/060959, 8 pages.
International Preliminary Report on Patentability dated Mar. 3, 2017 from PCT Patent Application No. PCT/US2015/060959, 7 pages.
Preliminary Amendment filed Sep. 26, 2016 from U.S. Appl. No. 15/239,417, 7 pages.
Non-Final Office Action dated May 25, 2017 from U.S. Appl. No. 15/239,417, 71 pages.
Final Office Action dated Jun. 14, 2017 from U.S. Appl. No. 14/947,740, 25 pages.
Applicant-Initiated Interview Summary dated Aug. 8, 2017 from U.S. Appl. No. 14/947,740, 3 pages.
Response filed Aug. 9, 2017 to the Final Office Action dated Jun. 14, 2017 from U.S. Appl. No. 14/947,740, 9 pages.
Applicant Initiated Interview Summary dated Aug. 15, 2017 from U.S. Appl. No. 15/239,417, 3 pages.
Non-Final Office Action dated Aug. 28, 2017 from U.S. Appl. No. 14/947,740, 21 pages.
Article 34 Amendment and Chapter II Demand filed Jun. 19, 2017 from PCT Patent Application No. PCT/US2016/061940, 21 pages.

(56) References Cited

OTHER PUBLICATIONS

Article 34 Amendment and Chapter II Demand filed May 19, 2017 from PCT Patent Application No. PCT/US2016/061942, 14 pages.
Response filed Aug. 23, 2017 to Non-Final Office Action dated May 25, 2017 from U.S. Appl. No. 15/239,417, 9 pages.
Communication pursuant to Rules 161(1) and 162 EPC dated Jul. 4, 2017 from European Patent Application No. 15801625.3-1972, 2 pages.
Written Opinion dated Sep. 6, 2017 from PCT Patent Application No. PCT/US2016/061940, 9 pages.
Final Office Action dated Nov. 2, 2017 from U.S. Appl. No. 14/947,994, 44 pages.
Written Opinion dated Aug. 24, 2017 from PCT Patent Application No. PCT/US2016/061942, 7 pages.
"International Search Report and Written Opinion Issued in PCT Application No. PCT/US2017/013687", dated Apr. 21, 2017, 12 Pages.
"Non Final Office Action issued in U.S. Appl No. 14/947,994", dated Apr. 5, 2018, 28 Pages.
"Non Final Office Action issued in U.S. Appl. No. 15/256,302", dated May 1, 2018, 9 Pages.
"Non Final Office Action issued in U.S. Appl. No. 15/374,594", dated Sep. 19, 2017, 11 Pages.
"Final Office Action issued in U.S. Appl. No. 15/414,432", dated May 17, 2018, 9 Pages.
"Non Final Office Action issued in U.S. Appl. No. 15/414,432", dated Nov. 29, 2017, 10 Pages.
"Notice of Allowance Issued in U.S. Appl. No. 15/618,067", dated May 24, 2018, 8 Pages.
"Notice of Allowance Issued in U.S. Appl. No. 15/691,524", dated Sep. 24, 2018, 10 Pages.
"International Search Report and Written Opinion issued in PCT Application No. PCT/US18/034245", dated Aug. 13, 2018, 14 pages.
"International Search Report and Written Opinion Issued in PCT Application No. PCT/US2017/013591", dated Apr. 21, 2017, 11 Pages.
"Final Office Action Issued in U.S. Appl. No. 15/256,302", dated Oct. 17, 2018, 12 Pages.
"International Search Report & Written Opinion Issued in PCT Application No. PCT/US18/034011", dated Nov. 16, 2018, 13 Pages.
"Non Final Office Action issued in U.S. Appl. No. 15/373,966", dated May 15, 2019, 7 Pages.

\* cited by examiner

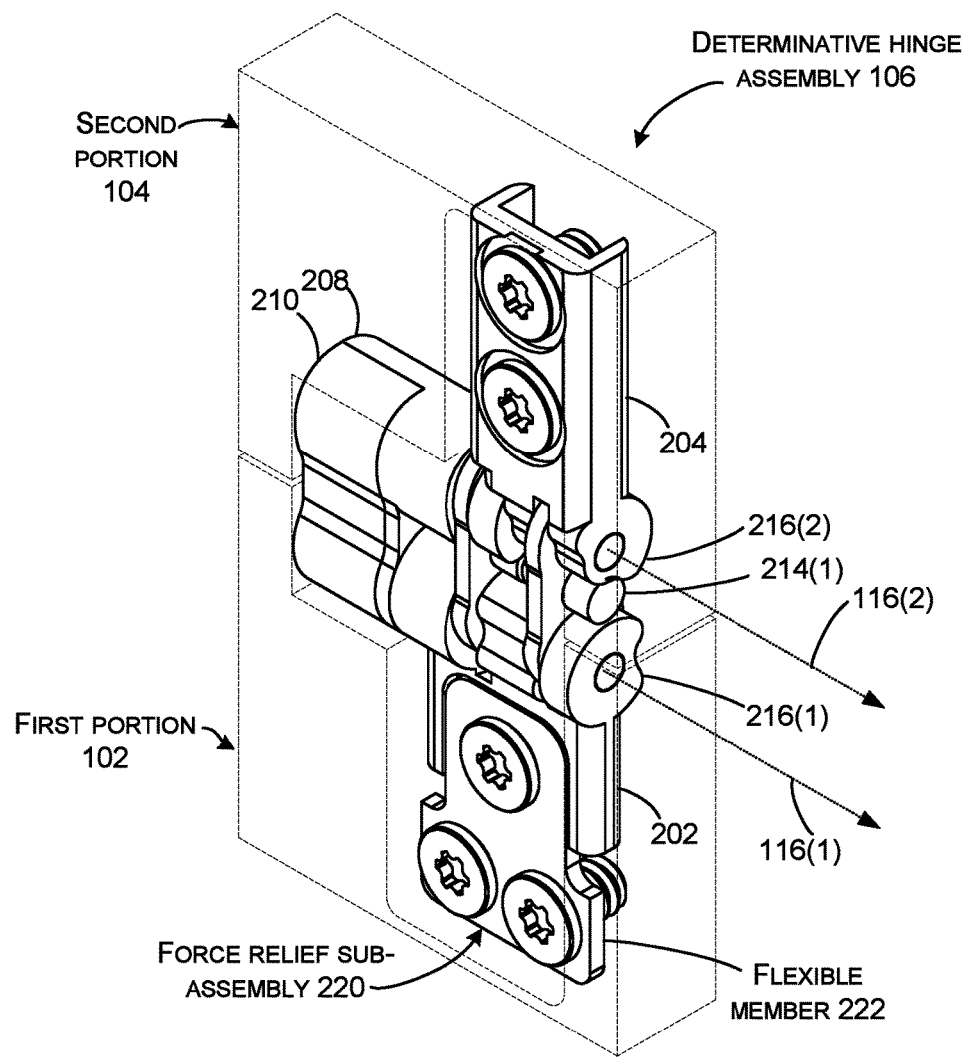
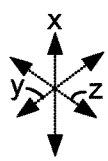
FIG. 2A

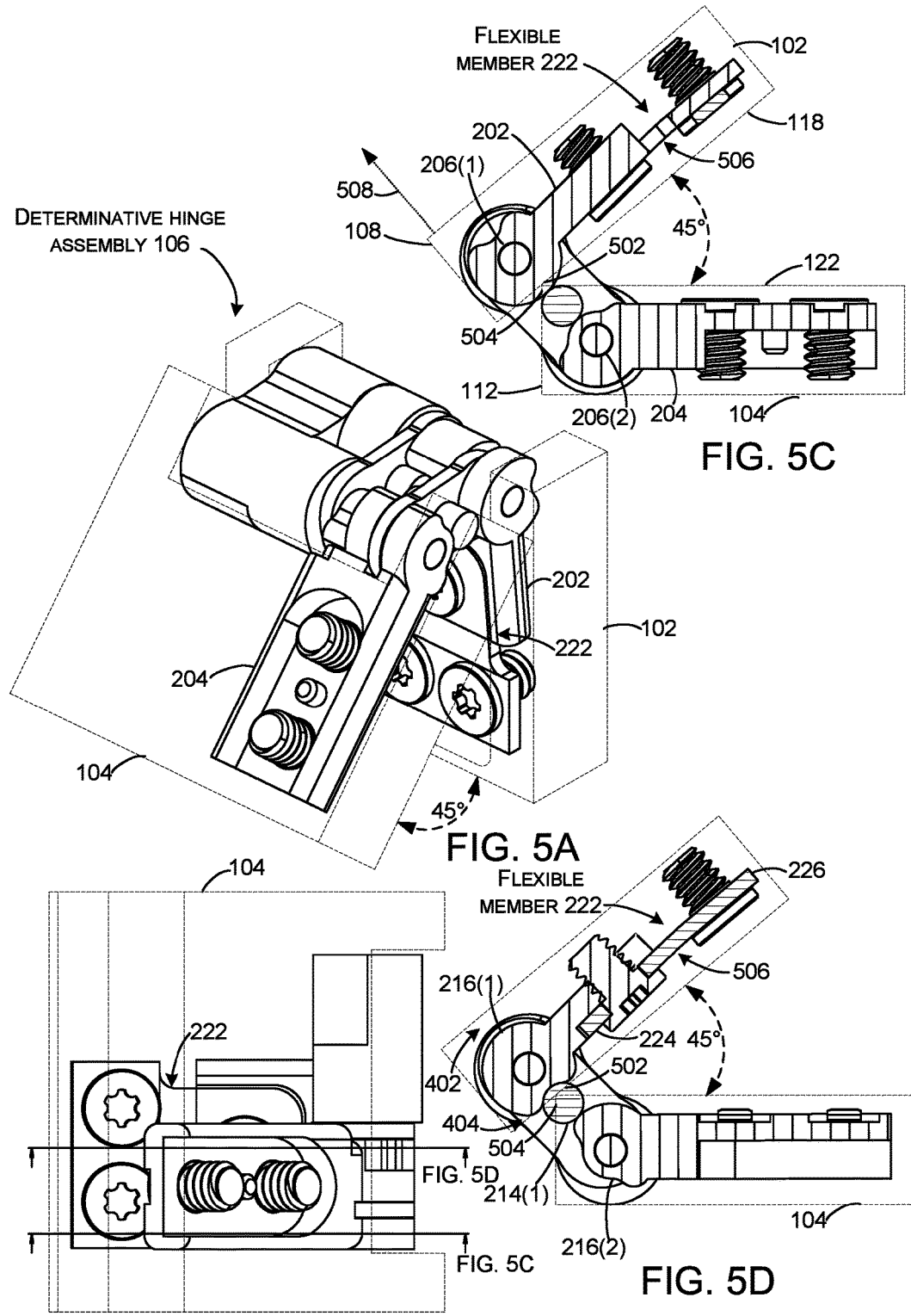

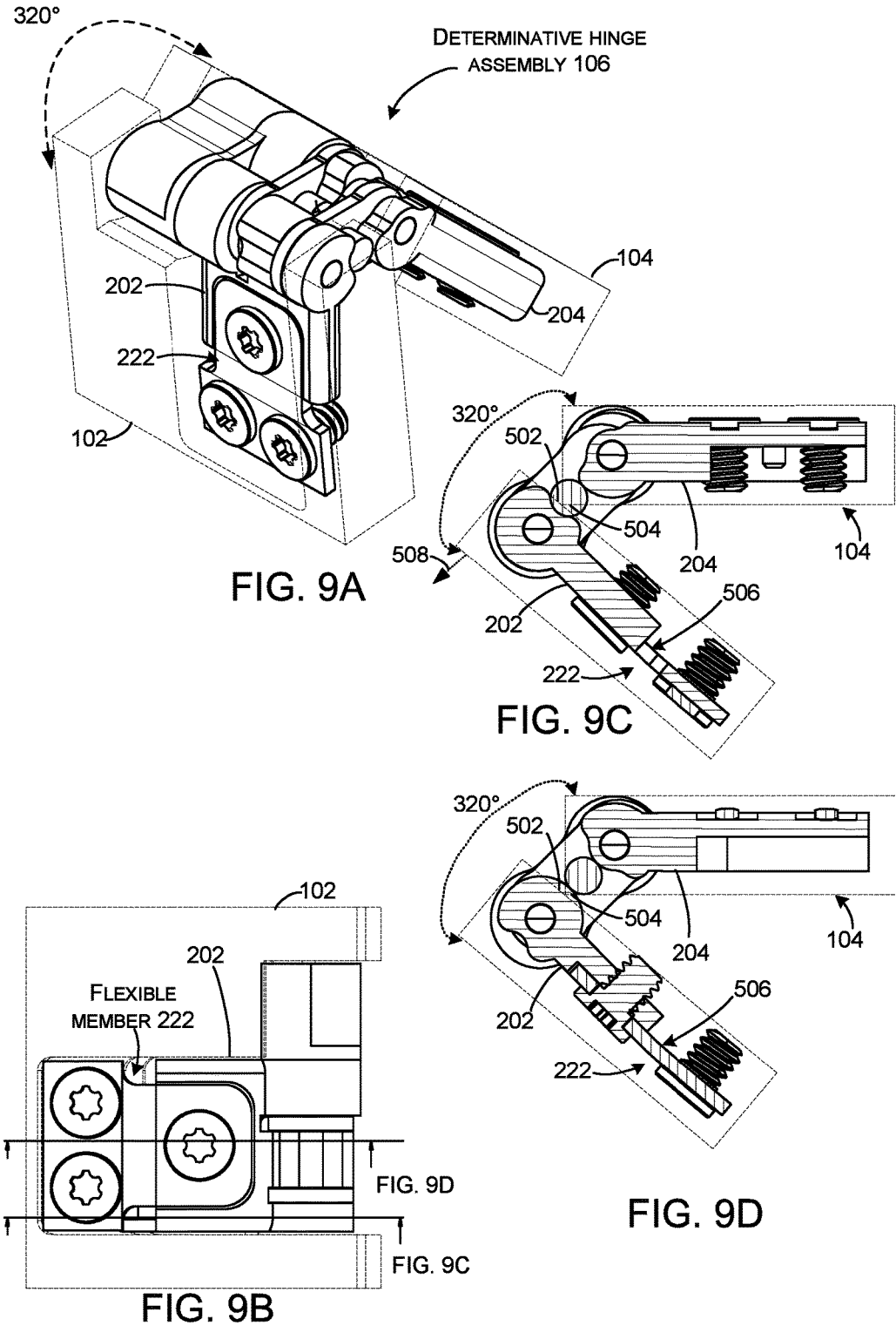

HINGED DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 1A, 1B, 1C, 2A, 4A, 5A, 6A, 7A, 8A, 9A, and 10A show perspective views of example devices in accordance with some implementations of the present concepts.

FIGS. 3A-3D, 4C, 4D, 5C, 5D, 6C, 6D, 7C, 7D, 8C, 8D, 9D, 9D, 10C, and 10D show sectional views of example devices in accordance with some implementations of the present concepts.

FIGS. 4B, 5B, 6B, 7B, 8B, 9B, and 10B show elevational views of example devices in accordance with some implementations of the present concepts.

DETAILED DESCRIPTION

The present concepts relate to devices, such as computing devices employing determinative hinge assemblies that can rotationally secure first and second device portions relative to a first hinge axis that relates to the first portion and a second hinge axis that relates to the second portion. The determinative hinge assembly can define which angles of rotation occur relative to which hinge axis. For instance, 0 to 90 degree rotation may occur around one of the hinge axes, 91-270 degrees may occur around the other hinge axis, and 271 to 360 may occur around the former hinge axis, for example. Traditionally, at certain angles of rotation, the first and second portions might contact one another. This contact can damage elements of either or both of the first and second portions. The determinative hinge assembly can solve this issue by allowing the first and second portions to move away from one another during this contact to lessen forces imparted on the first and second portions (e.g., the determinative hinge assembly can function as the compliant member in the system). The determinative hinge assembly can accomplish this movement with a force-relief sub-assembly. The force-relief sub-assembly can flex in a manner that allows the first and second portions to move slightly away from one another proximate to the hinge axis during contact and to return when contact ceases.

Figure 1A:
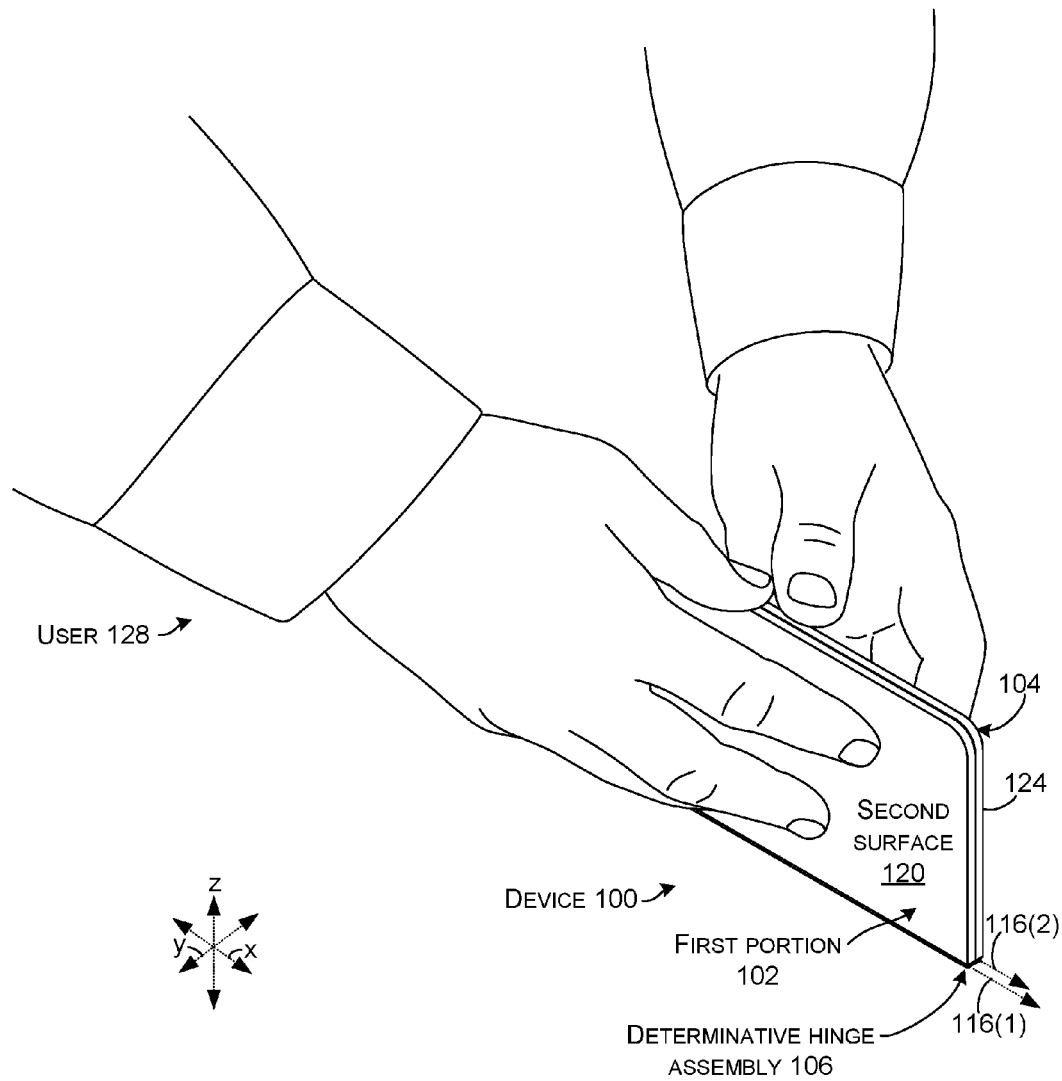
Figure 1B:
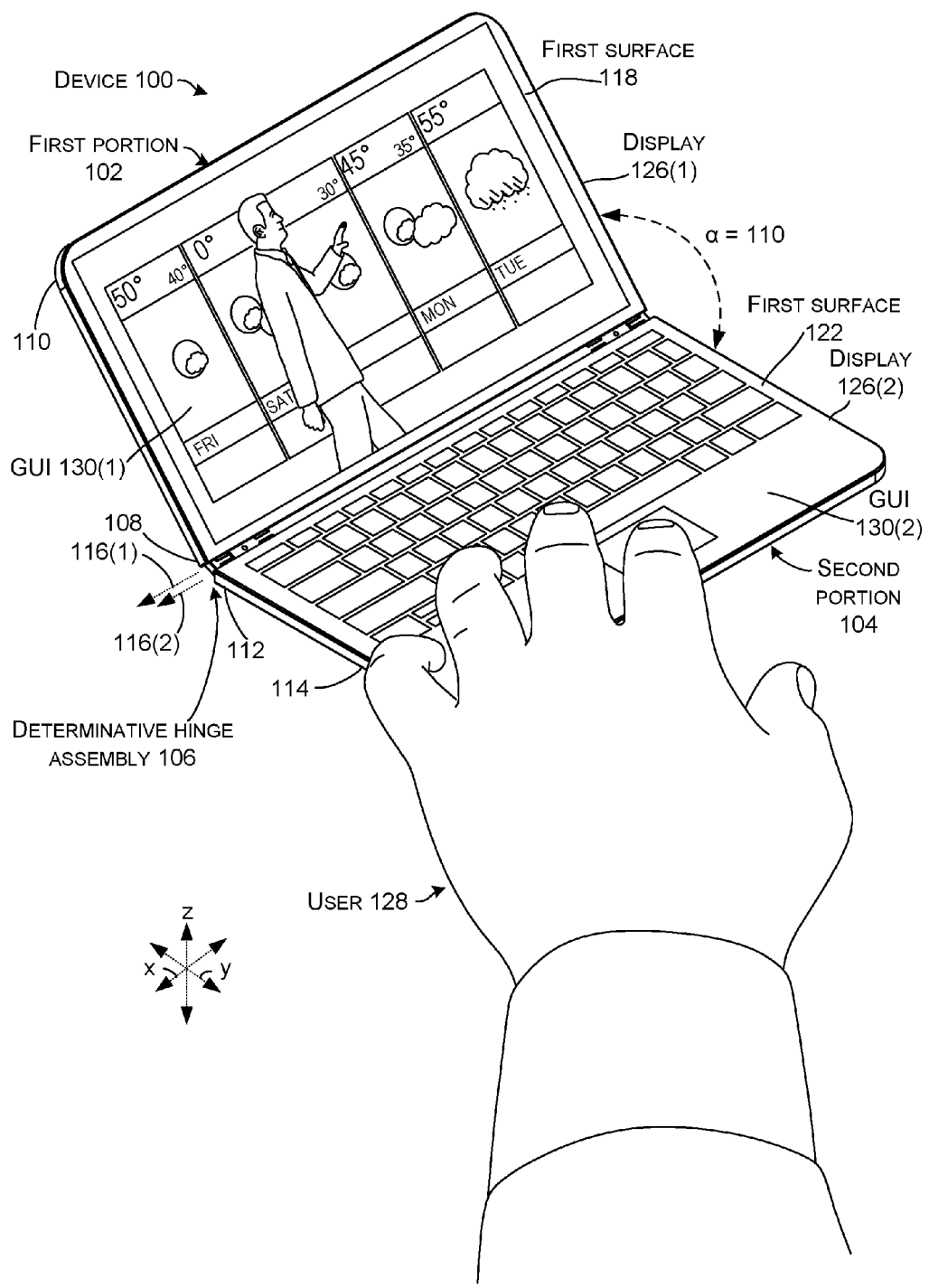
Figure 1C:
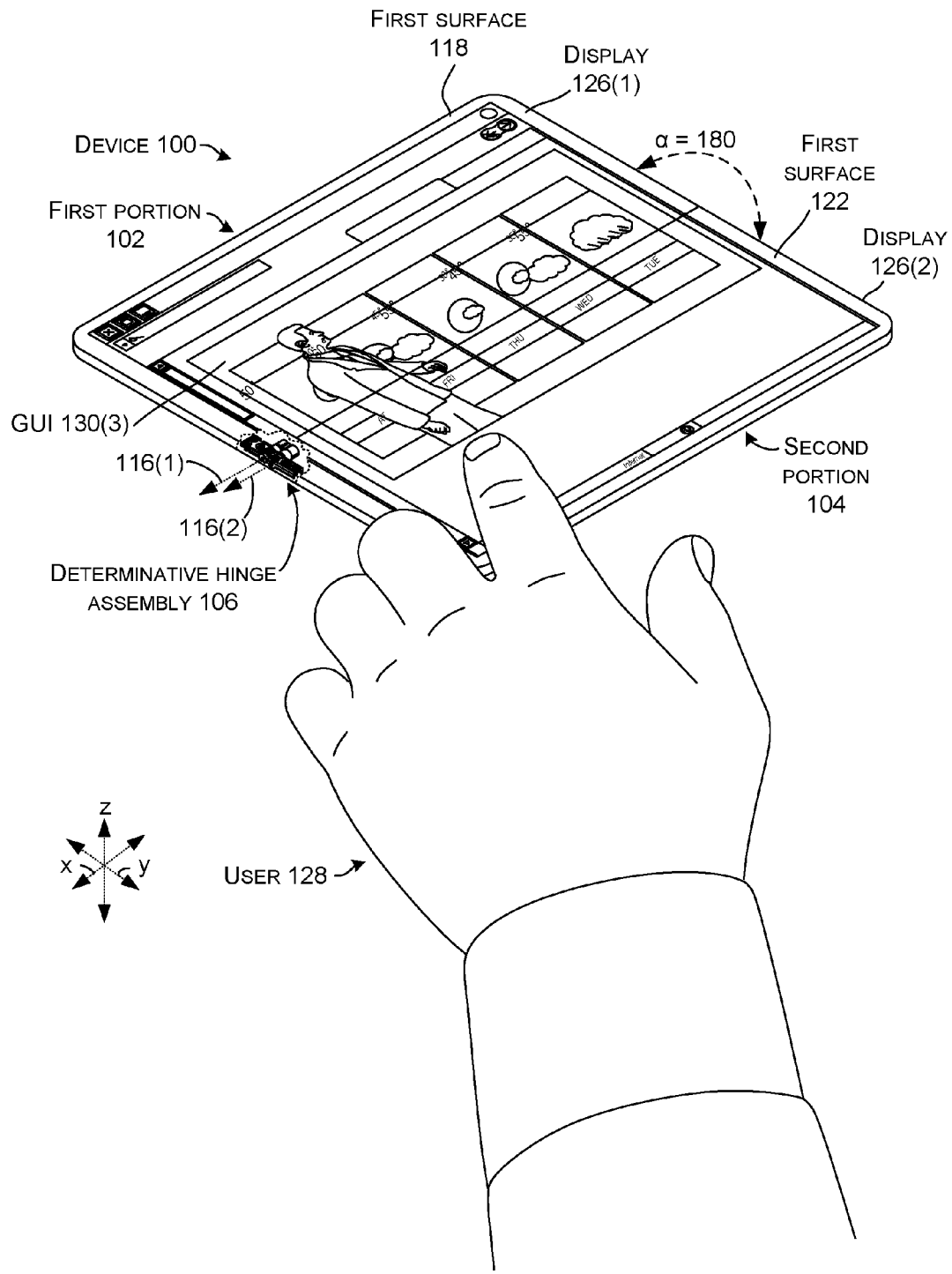

Introductory FIGS. 1A-1C show an example device 100 in a use case scenario. The device 100 can have first and second portions 102 and 104 that are rotatably secured together by a determinative hinge assembly 106 (indicated generally in FIGS. 1A and 1B and shown in cut-away in FIG. 1C). The first portion 102 can extend from a hinge end 108 to a distal end 110. The second portion 104 also can extend from a hinge end 112 to a distal end 114. The determinative hinge assembly 106 can define two hinge axes (e.g., axes of rotation) 116. The first portion 102 can rotate around first hinge axis 116(1) and the second portion 104 can rotate around second hinge axis 116(2). The determinative nature of the determinative hinge assembly 106 can control the relative order of rotation around the two hinge axes 116(1) and 116(2). Stated another way, given a range of rotation (e.g., set of angles) of the first and second portions, the determinative hinge assembly can define sub-ranges of rotation (e.g., individual angles) where rotation occurs around a specific hinge axis.

The first portion 102 can include opposing first and second surfaces 118 and 120, which can be parallel to one another. Similarly, the second portion 104 can include opposing first and second surfaces 122 and 124, which can be parallel to one another. In some implementations the first and/or second surfaces 118, 122, 120, and/or 124 can be planar surfaces. In some implementations, displays 126 can be positioned on the first and/or second surfaces. In this case, displays 126(1) and 126(2) are positioned on first surfaces 118 and 122, respectively.

As mentioned, FIGS. 1A-1C collectively show a use case scenario of device 100. FIG. 1A starts with device 100 in the closed orientation where the first and second portions 102 and 104 are positioned against one another and are rotatably secured by determinative hinge assembly 106. In this case, the second surfaces are facing outwardly with the first portion's second surface 120 facing the reader and the first surfaces (designated in FIG. 1B) facing inwardly. The closed orientation can be very compact and easy for a user 128 to transport. For instance, the device may fit in the user's pocket. Further, the first surfaces can be protected in this closed orientation by the second surfaces. The device can be biased to maintain this orientation until acted upon by the user. At this point user 128 is starting to open the device 100 (e.g., rotate the device portions 102 and 104 away from one another).

FIG. 1B shows the device 100 opened to an angle defined between the first and second portions 102 and 104 of about 110 degrees. This orientation can be thought of as a 'notebook' or 'laptop' orientation. The notebook orientation can be manifest as an angle in a range from about 90 degrees to about 150 degrees. In this case, the device portions 102 and 104 are configured to maintain this relative orientation while the user uses the device. In this example, video content is presented on a graphical user interface (GUI) 130(1) on display 126(1) of the first portion 102 and a virtual keyboard is presented on a GUI 130(2) on display 126(2) on second portion 104. The user can control GUI 130(1) via the virtual keyboard of GUI 130(2).

FIG. 1C shows the device 100 rotated until the relative angle is about 180 degrees between the first and second portions 102 and 104. In this orientation, a single GUI 130(3) can be presented collectively across displays 126(1) and 126(2). This GUI 130(3) offers basically twice the display area of either device portion 102 or 104. The GUI 130(3) can be more pleasing to the user when the first and second portions abut one another to make the GUI nearly seamless between the two displays 126(1) and 126(2). When not in use, the user can close the device 100 to a compact easy to carry configuration (e.g., see FIG. 1A) that protects the displays 126 from damage.

Note that while obscured by the displays 126, several electronic components, such as circuit boards, processors, and/or storage/memory can be secured to the first and second portions 102 and/or 104.

The processor can generate the GUIs 130 for presentation on the displays 126. In some implementations, the processor may generate different GUIs for the displays when the first and second portions 102 and 104 are in some orientations and a single GUI for a combined presentation in other orientations. For instance, when the first and second portions are oriented at 90 degrees relative to one another, the processor may generate a first GUI for presentation on the first portion and a second GUI for presentation on the second portion. When the first and second portions are oriented to 180 degrees, the processor can generate a single GUI that is collectively presented across both displays to create a larger display area. In other orientations, such as the alarm clock orientation, the same GUI may be presented on both the first and second portions. For instance, the time could be presented on both portions so that it is visible from more positions around the device. Thus, the processor can control the GUIs based upon the relative angle of the first and second portions.

Stated another way, in some configurations, the first surfaces 118 and 122 can be manifest as displays 126, such that in the open-book orientation of FIG. 1C the displays can work cooperatively to create a larger (e.g., 2×) display area. In some cases, the second surfaces 120 and 124 can be manifest as protective covers so that in the orientation of FIG. 1A the protective covers protect the displays of the first surfaces. In other configurations, both the first and second surfaces can include displays, or neither can include displays.

Figure 2B:
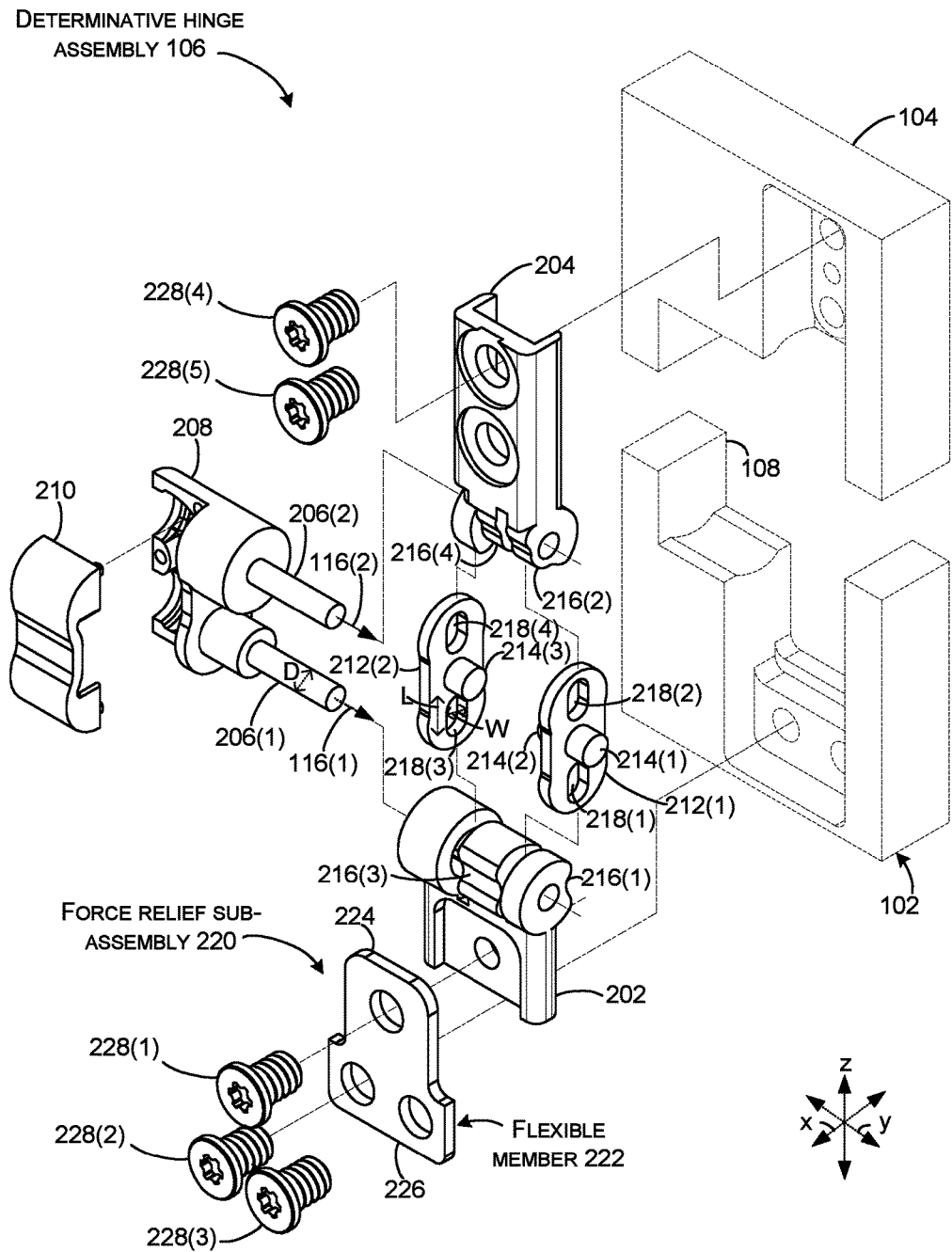
FIG. 2B shows an exploded perspective view of an example device in accordance with some implementations of the present concepts.

FIGS. 2A and 2B show more details of example determinative hinge assembly 106. Determinative hinge assembly 106 can rotate a first body 202 and a second body 204 about axes of rotation (e.g., hinge axes) 116. In some implementations, the first body 202 and the second body 204 may be brackets configured to attach to first and second portions 102 and 104 (FIGS. 1A and 1B), respectively. In other implementations, the first body 202 may be a part of the first portion 102 and the second body 204 may part of second portion 104.

Axis of rotation (e.g., hinge axes) 116(1) can be defined by a hinge pin 206(1) associated with a communication member 208 and axis of rotation 116(2) can be defined by another hinge pin 206(2). The communication member 208 can also be associated with a cover 210.

In some implementations, rotation around the first hinge axis 116(1) and/or the second hinge axis 116(2) may be selectively locked and unlocked, such as by the use of sliders 212 and associated followers 214. In this case, followers 214(1) and 214(2) are positioned on slider 212(1) and follower 214(3) is positioned on slider 212(2).

The determinative hinge assembly 106 may include cams 216 associated with the first body 202 and/or the second body 204. In this example, first and second cams 216(1) and 216(3) are located on the first body 202 and third and fourth cams 216(2) and 216(4) are located on the second body 204. The cams 216 may have a pattern of low areas and/or high areas to allow or urge an individual follower 214 to move relative to an individual hinge pin 206 during rotation of the determinant hinge assembly 106. This aspect is described in more detail below relative to FIGS. 3A-3D. In some implementations, the opposing cams may act directly on one another to lock and unlock rotation around individual hinge axes 116. In other implementations, the cams can act upon an interposed element, such as the followers 214 employed in the illustrated implementation. In this configuration interaction of the cams and the followers can lock and unlock rotation around individual hinge axes.

In this implementation, sliders 212 can includes apertures 218 through which the hinge pins 206 can pass. In the illustrated configuration hinge pin 206(1) passes through aperture 218(1) in slider 212(1) and aperture 218(3) in slider 212(2). Similarly, hinge pin 206(2) passes through aperture 218(2) in slider 212(1) and aperture 218(4) in slider 212(2).

Individual apertures 218 can be elongate such that a width W of the aperture is approximately equal or slightly larger than a diameter D of the received hinge pin 206 while a length L of the aperture is substantially greater than the hinge pin diameter. (In order to reduce clutter on the drawing page, the diameter D, length L, and width W are labeled in only one instance on the drawing page of FIG. 2B). Thus, the apertures 218 can be elongated in a direction to allow the movement of the sliders 212 relative to the hinge pins 206. The extent of movement of the sliders 212 relative to the hinge pins 206 can be at least partially related to the aperture length L. For example, the amount of movement (e.g. stroke) of the sliders 212 (and hence, any followers 214 connected thereto) may be the difference between the aperture length L and the diameter D of the hinge pins 206. In other implementations, the stroke of the sliders can be determined by the cam rise and fall between the two halves of the hinge. The width of the apertures can be slightly larger than the diameter of the hinge pins that go through the apertures. This ensures a single degree of translational freedom for the sliders 212. Note that in the illustrated implementation the apertures 218 have approximately equal lengths. In other implementations, the apertures 218(1) and 218(2) of the slider 212(1) can be different lengths from apertures 218(3) and 218(4) of slider 212(2).

The determinative hinge assembly 106 can further include a force relief sub-assembly 220. In this example, the force relief sub-assembly is manifest as a flexible member 222. The flexible member can be secured between the hinge assembly and either the first and/or second portions 102 and/or 104. In the illustrated configuration, the flexible member 222 is secured between the first body 202 and the first portion 102. In this case, flexible member 222 extends between a first end 224 and a second end 226. The first end 224 of the flexible member is secured to the first body 202 with a threaded fastener 228(1) and to the first portion 102 with threaded fasteners 228(2) and 228(3). Threaded fasteners 228(4) and 228(5) secure the hinge assembly's second body 204 to the second portion 104. Other elements for securing the elements are contemplated.

Note that in the illustrated implementation, the first portion 102 is secured to the first body 202 and cam 216(1) indirectly through the flexible member 222. As such, hinge end 108 of the first portion 102 can move relative to the first body 202 during rotation of the first and second portions 102 and 104. The force relief sub-assembly 220 can be configured to give if/when the first portion 102 contacts the second portion 104 during rotation. In the illustrated configuration, the 'giving' of the force relief sub-assembly can be accomplished by flexing of the flexible member between the first end 224 and the second end 226. The flexion can reduce forces experienced by the first and second portions 102 and 104 that could damage sensitive elements. For instance, displays 126 on the first and second portions could contact one another during specific angular rotations. The flexible member 222 can flex to reduce and/or prevent damage, such as cracking of the displays. This flexion aspect is described in more detail below relative to FIGS. 4A-10D.

In some implementations, a communication member 208 may have one or more wires and/or cables extending therethrough, or, in other implementations, provides a direct electrical contact through which the determinative hinge assembly 106 may have electrical communication between the first portion 102 and second portion 104, or electronic components connected thereto. Data and/or electrical communication through the communication member 208 may allow electricity and/or data to be sent across the determinative hinge assembly 106 between, for example, a display 126 (FIG. 1B) connected to the first portion 102 and one or more computing components connected to the second portion 104. In some implementations, the communication member 208 provides electrical communication. In some implementations, the communication member 208 provides electrical and data communication. In yet other implementations, the communication member 208 provides data communication without electrical communication, such as via fiber optic cables.

In other implementations, first and second communication members 208 may be positioned in the determinative hinge assembly 106. The first communication member and second communication member may have one or more wires and/or cables extending between them or, in other implementations, a direct electrical contact between the first communication member and second communication member may allow electrical communication between the first communication member and second communication member. Data and/or electrical communication through the first communication member and second communication member may allow electricity and/or data to be sent across the determinative hinge assembly 106 between, for example, display (126, FIG. 1B) connected to the first portion 102 and one or more computing components connected to the second portion 104.

FIGS. 3A-3D show how an example determinative hinge assembly 106A can control when rotation occurs around individual hinge axes 116 (extending into and out of the page in the center of hinge pins 206. (The suffix 'A' is used relative to determinative hinge assembly 106A to convey that components of this determinative hinge assembly may or may not differ from other determinative hinge examples. To avoid clutter on the drawing page the 'A' suffix is not carried through to individual components).

Figure 3A:
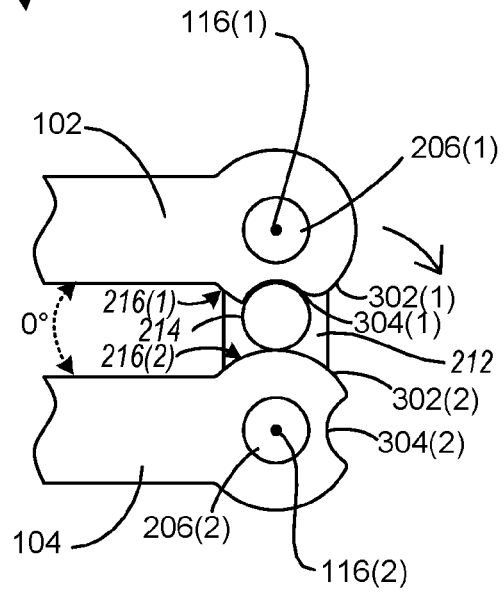

FIG. 3A illustrates the determinative hinge assembly 106A in the closed (e.g., zero degree angle between the first and second portions 102 and 104) position. Note that in this implementation, individual cams 216 include a 'high' area 302 and a low or recessed area 304. In the closed position, the high area 302(2) of cam 216(2) contacts follower 214 and forces the follower into recessed area 304(1) of cam 216(1). At this point, rotation around first hinge axis 116(1) is blocked because follower 214 cannot move downward (e.g., away from hinge axis 116(1) and toward hinge axis 116(2)) and is instead 'stuck' in the recessed area 304(1). In contrast, rotation around hinge axis 116(2) can occur with follower 214 traveling across high area 302(2).

Figure 3B:
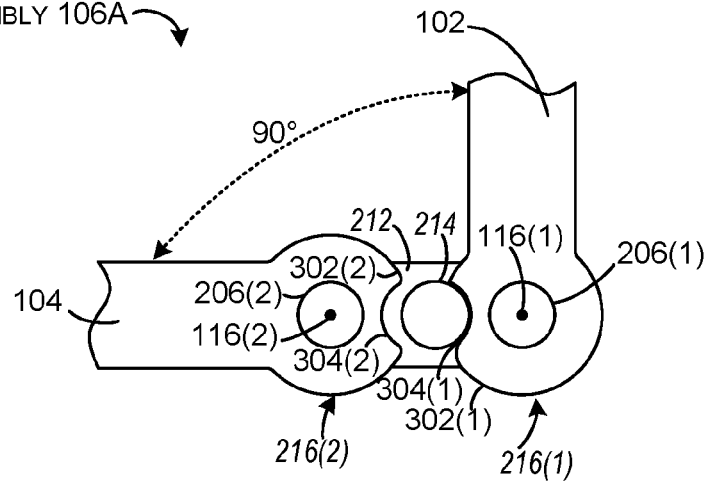

FIG. 3B shows a subsequent orientation of determinative hinge assembly 106A where rotation around the second hinge axis 116(2) has progressed until the angle between the first and second portions 102 and 104 is about 90 degrees. At this point, follower 214 is proximate to the recessed area 304(1) of cam 216(1) and thus there is space between the follower 214 and cam 216(2).

Figure 3C:
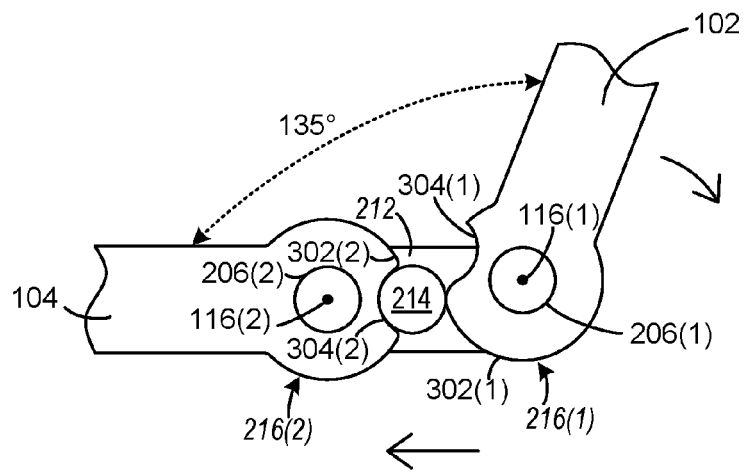

FIG. 3C shows rotation around hinge axis 116(1) rotating contact with follower 214 from recess area 304(1) to high area 302(1). This contact forces the follower away from hinge axis 116(1) and toward hinge axis 116(2) (e.g., into recess area 304(2) of cam 216(2)). As such, at this point, rotation can continue around hinge axis 116(1), but rotation is blocked around hinge axis 116(2).

Figure 3D:
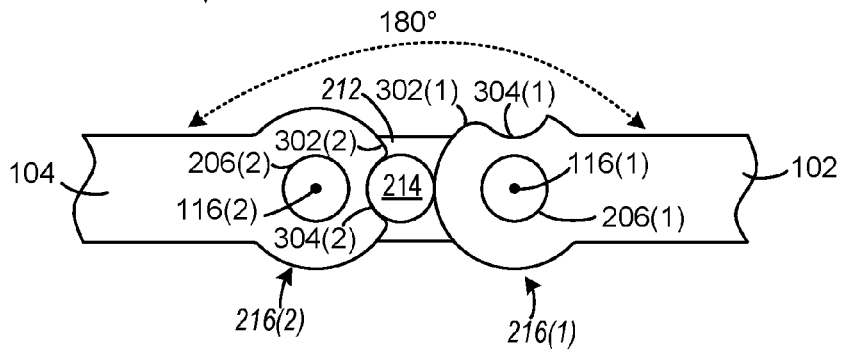
Figure 4A:
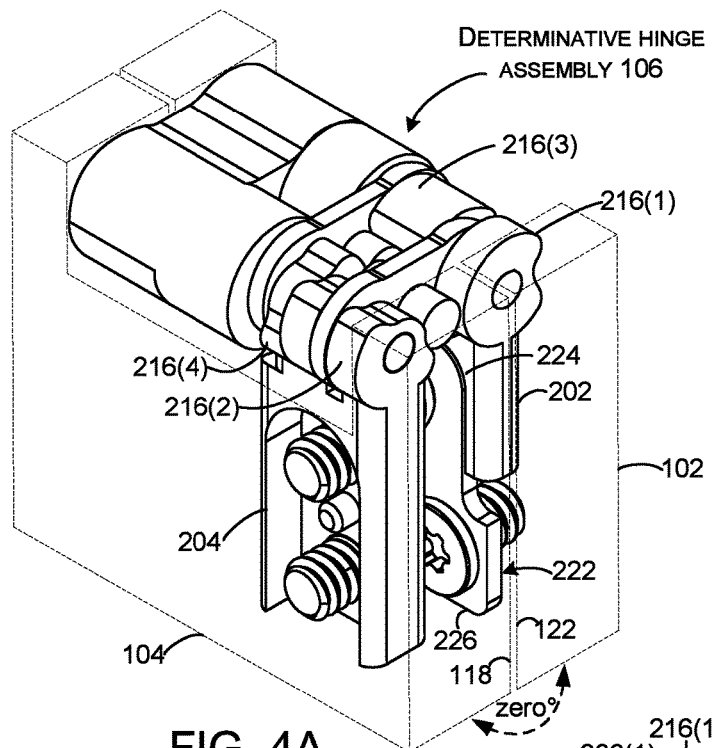
Figure 4C:
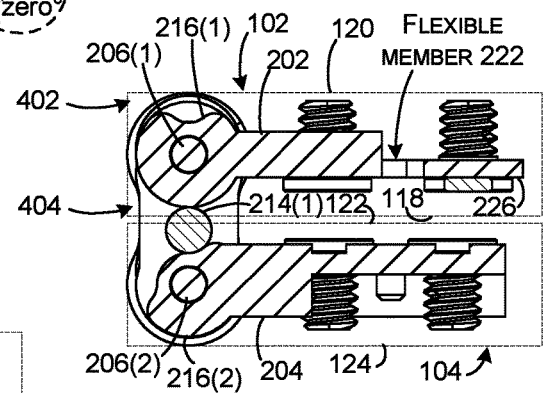
Figure 4B:
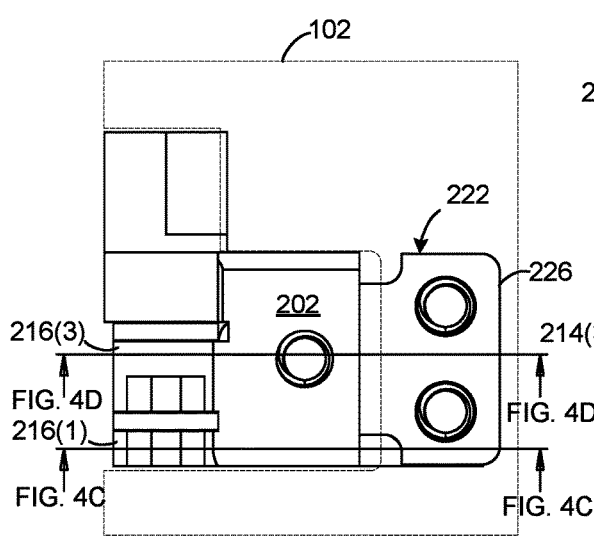
Figure 4D:
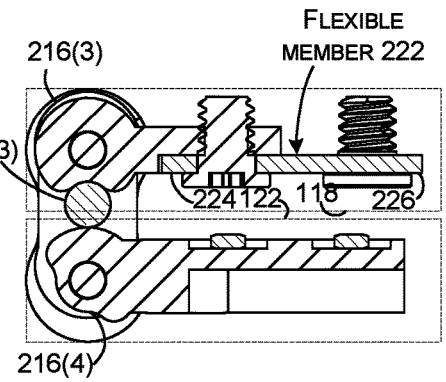
Figure 6A:
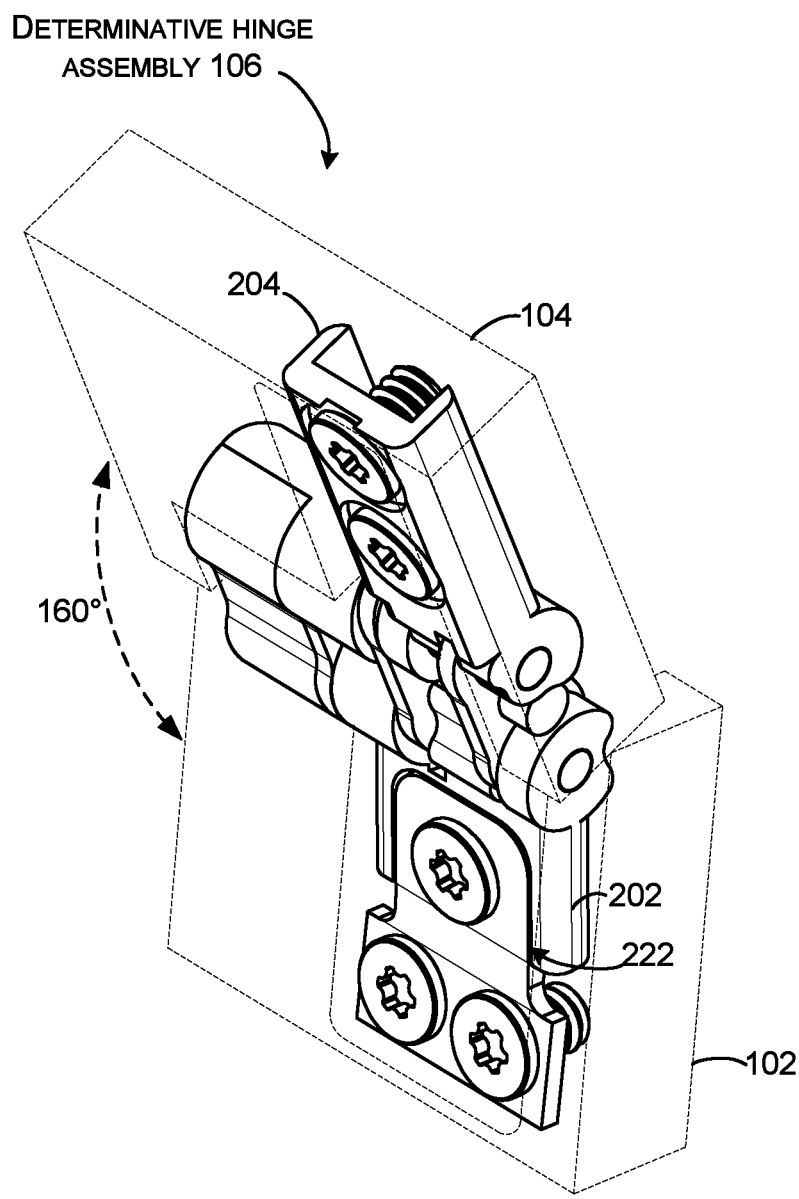
Figure 6B:
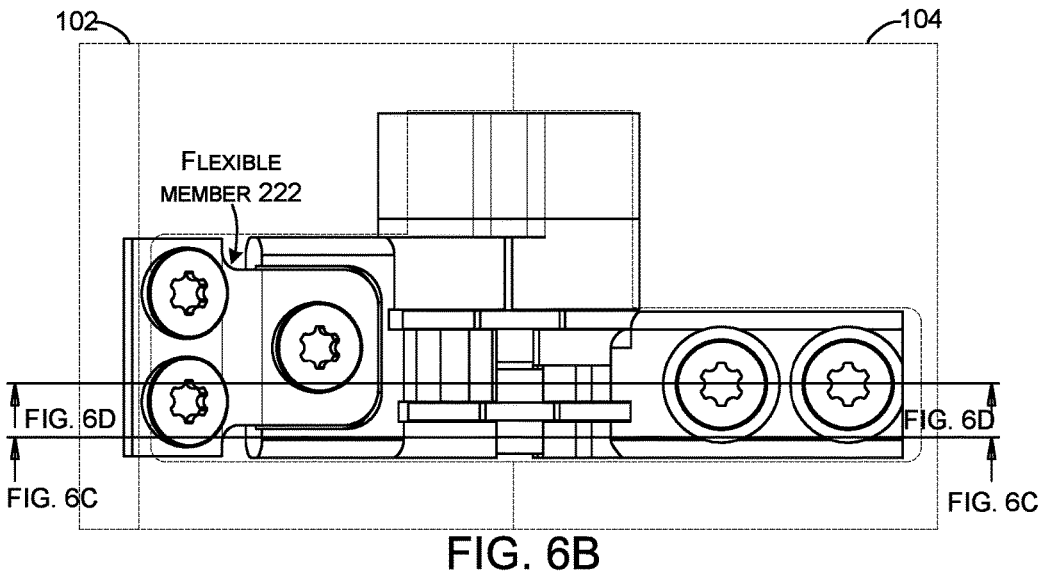
Figure 6C:
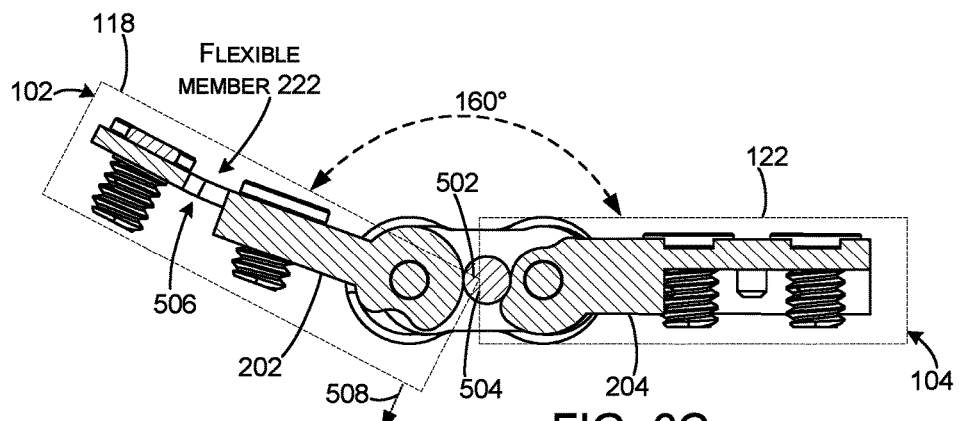
Figure 6D:
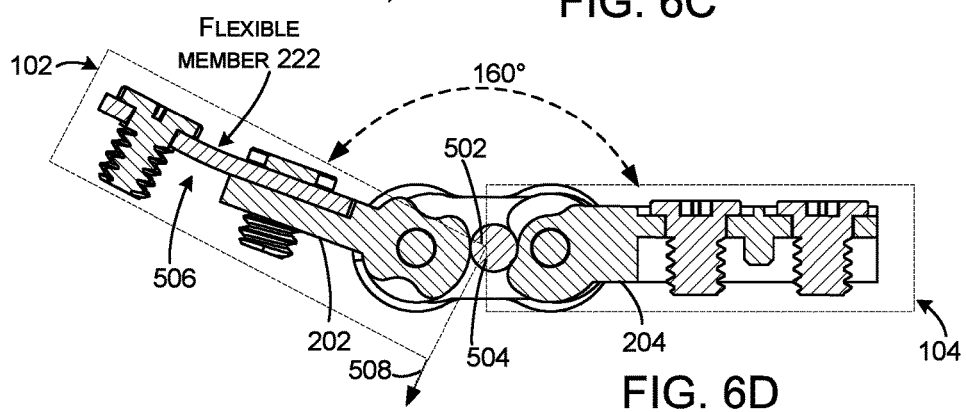
Figure 7A:
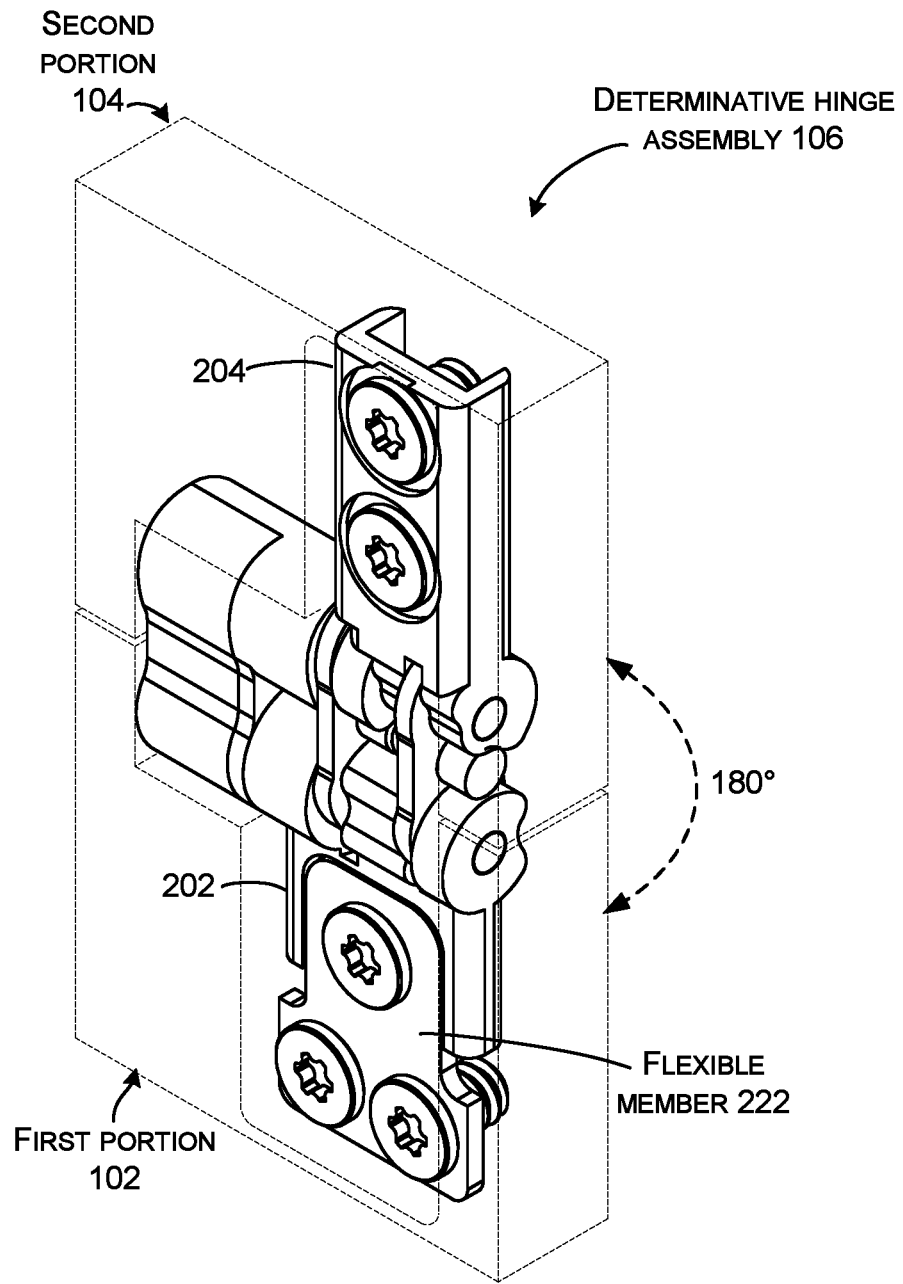
Figure 7B:
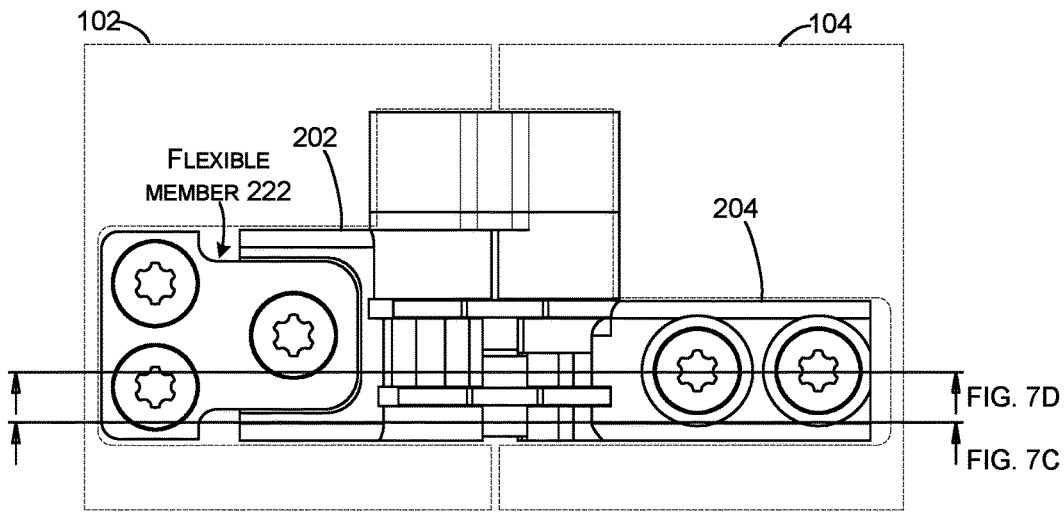
Figure 7C:
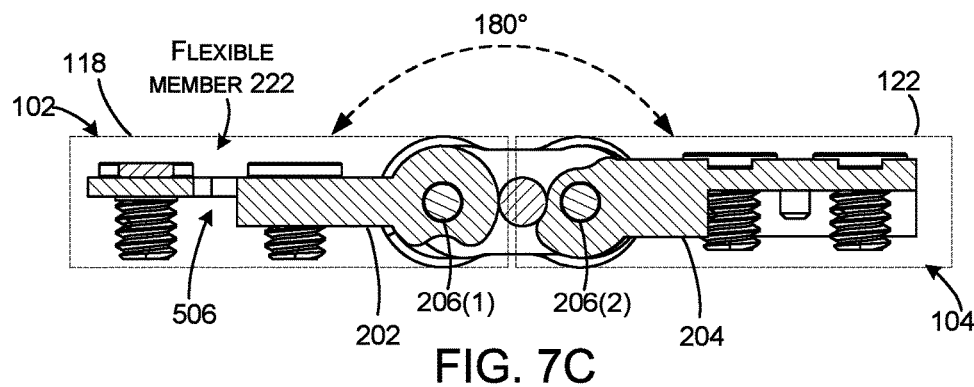
Figure 7D:
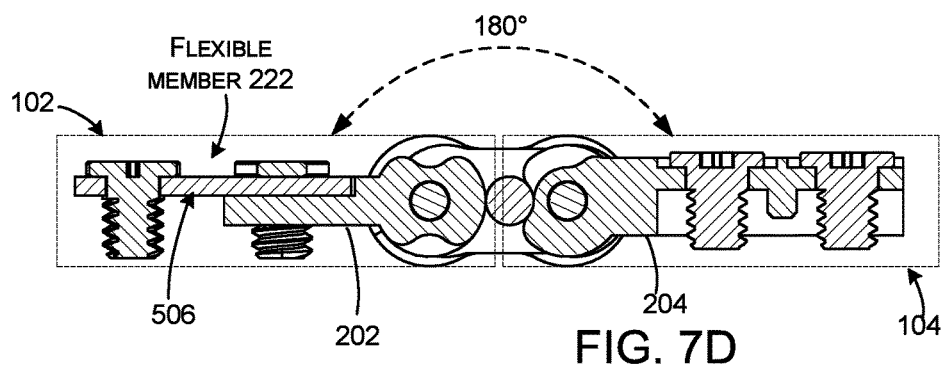
Figure 8A:
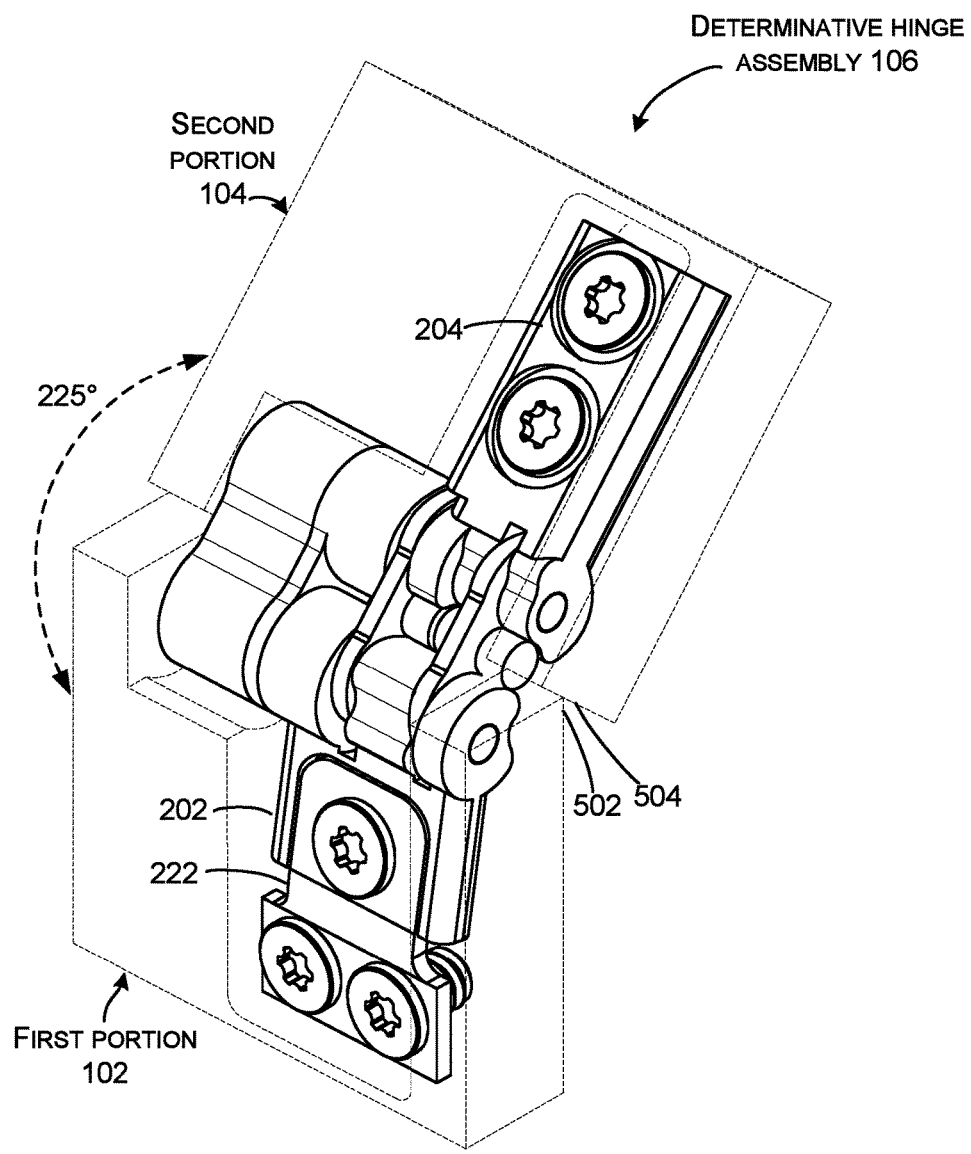
Figure 8B:
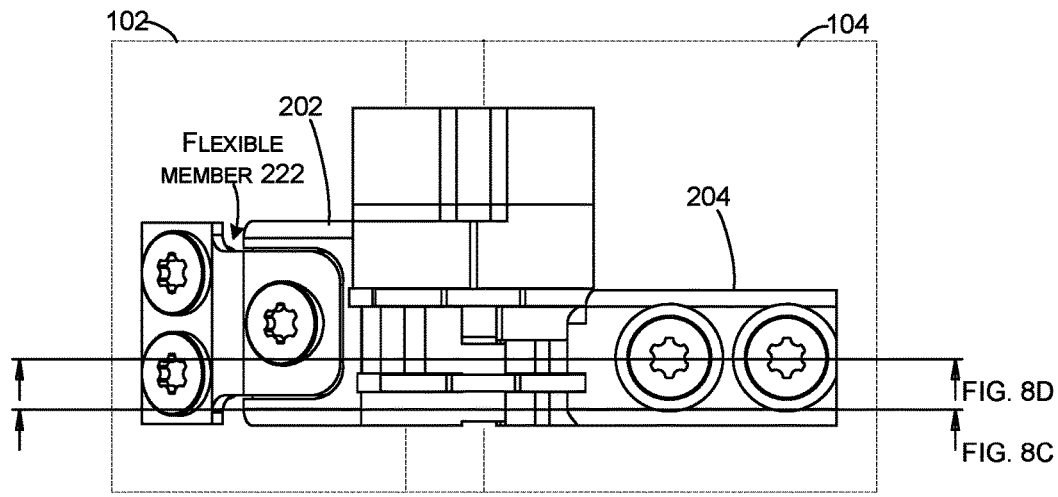
Figure 8C:
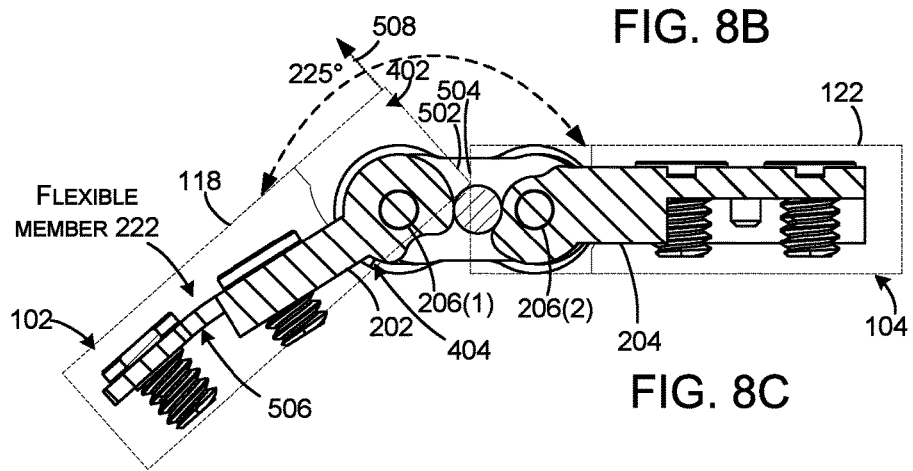
Figure 8D:
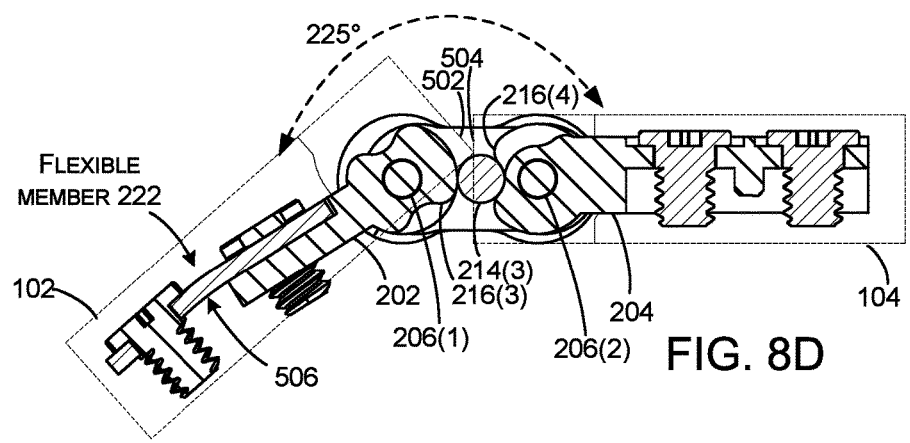
Figure 10A:
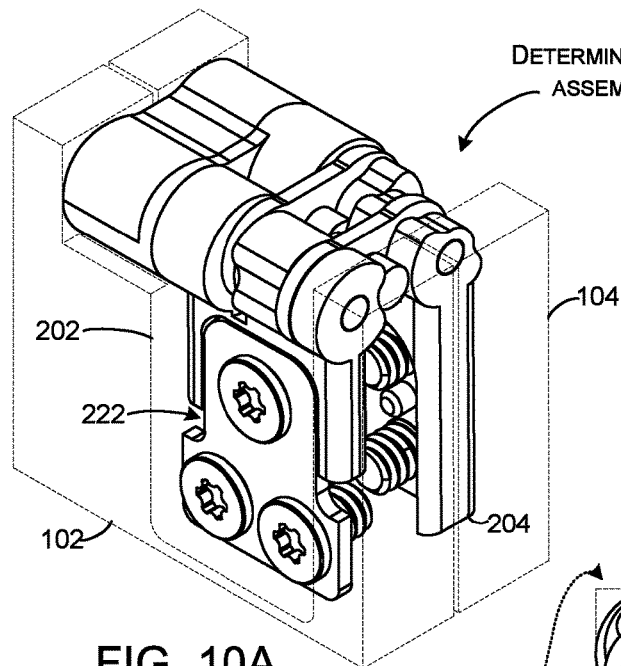
Figure 10C:
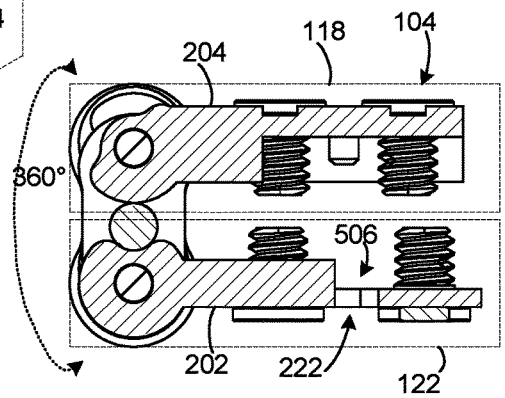
Figure 10B:
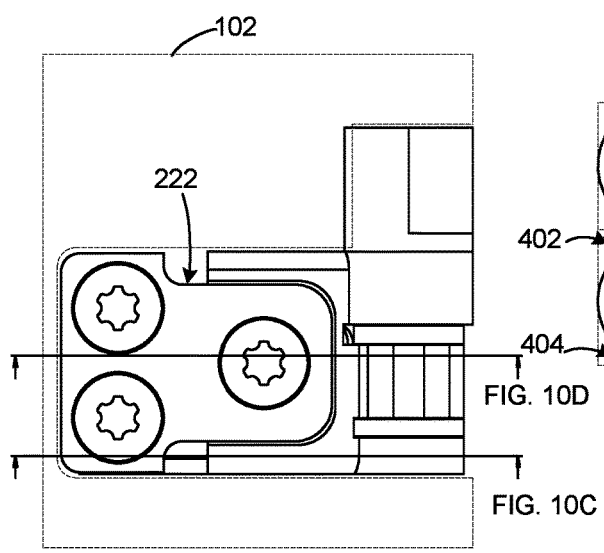
Figure 10D:
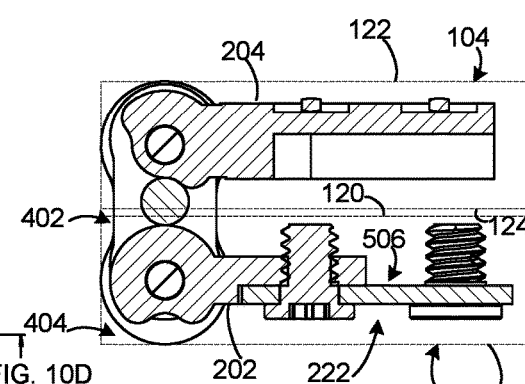

FIG. 3D shows continued rotation around hinge axis 116(1) until the first and second portions 102 and 104 are 180 degrees apart. During this rotation from 135 degrees of FIG. 3C to 180 degrees of FIG. 3D, rotation around hinge axis 116(2) is blocked by follower 214 interacting with recess area 304(2) of cam 216(2) and the follower being locked by cam 216(1). The example sequences shown in FIGS. 3A-3D show how example determinative hinge assembly 106A can control rotation around individual hinge axes for ranges of angles between zero and 180 degrees. Viewed another way, for a first sub-range of the angles, rotation occurs around hinge axis 116(2) while rotation around hinge axis 116(1) is locked and for a second sub-range of angles, rotation occurs around hinge axis 116(1) while rotation around hinge axis 116(2) is locked. While the illustrated example has a range of rotation of 180 degrees, other implementations can control rotation for other ranges of rotation, such as by employing different cam patterns of high and recessed areas and or by employing multiple cams, such as one set to control rotation in a first range and another set to control rotation in a different range. Similarly, the illustrated cams and/or different cams can be used to control rotation in the opposite direction (e.g., counter-rotation).

FIGS. 4A-10D collectively show determinative hinge assembly 106 at specific degrees of relative rotation. These FIGS. collectively show how flexible member 222 can facilitate rotation and/or reduce a likelihood of device damage during rotation of the first and/or second portion 102 and 104. Rotation around the hinge axes 116 can be controlled by the determinative hinge assembly 106, such as by cams 216(1) and 216(2) in cooperation with follower 214(1) and cams 216(3) and 216(4) in cooperation with follower 214(3). Recall that the flexible member 222 secures the first body 202 relative to the first portion 102.

FIGS. 4A-4D show the first portion 102 and the second portion 104 defining a zero degree relative angle. In this orientation, the first surface 118 of the first portion is positioned parallel and generally against the first surface 122 of the second portion (e.g., closed book orientation). Further, in this implementation, the first surface 118 is parallel to the flexible member 222, which is in a non-flexed state. In the illustrated implementation, the flexible member is generally planar in the unflexed state and tends to be oriented parallel to the first and second surfaces. Further, the first body 202 is generally centered relative to the first portion 102 (e.g., generally equal spacing at 402 and 404 relative to the first surface 118 and the second surface 122).

FIGS. 5A-5D show the first portion 102 rotated forty-five degrees relative to the second portion 104. The rotation from the zero degree orientation to the forty-five degree orientation can occur around hinge pin 206(2) rather that hinge pin 206(1) as defined by cams 216(1) and 216(2) and follower 214(1). Also note that a region 502 of first surface 118 of the first portion is contacting a region 504 of second portion 104. Traditionally, this contact could damage either or both of first surface 118 and/or second surface 122. However, note that in this implementation, the contact can be mitigated by flexible member 222. Note that in the forty-five degree orientation the contact of the region 502 against the region 504 caused the flexible member 222 to flex from the planar configuration of FIGS. 4A-4D to a flexed configuration. In the flexed configuration, at least a portion 506 of the flexible member can transition from the non-flexed state. In this example, portion 506 is no longer parallel to first surface 118 and in some implementations can be characterized as being arcuate.

Comparison of FIGS. 4A-4D with FIGS. 5A-5D illustrates the 'flexible' nature of the flexible member 222 in this implementation. In this case, the flexible member is flexible yet semi-rigid. Viewed from one perspective, the flexible member can be flexible between the first end 224 and the second end 226, but more rigid in the transverse direction (parallel to the hinge axes). In some implementations, the flexible member can be manifest as a leaf spring that flexes along its length (e.g., between the first and second ends 224 and 226) when exposed to loads and then returns to its original configuration when the loads are removed.

Flexing of the flexible member 222 has allowed hinge end 108 of the first portion 102 to move away from the hinge end 112 of the second portion 104 as indicated at 508. This is evidenced by the increasing spacing at 402 and the decreasing spacing at 404. Allowing the hinge ends of the first and second portions to move away from each other can lessen contact forces imparted on regions 502 and/or 504 of the first and second portions 102 and 104.

FIGS. 6A-6D show additional relative rotation so that the first and second portions 102 and 104 are oriented at about 160 degrees to one another. At this point contact again occurs between region 502 of the first portion 102 and region 504 of the second portion 104 (the exact location of the contact has migrated somewhat from the 45 degree orientation). However, flexible member 222 continues to allow the first portion 102 to move away from the second portion 104 as indicated at 508. This movement is enabled by flexing at portion 506 of the flexible member 222.

FIGS. 7A-7D show additional relative rotation so that the first and second portions 102 and 104 are oriented at about 180 degrees to one another until they are abutting in an open book orientation. At this point, the stressful contact between regions 502 and 504 has ceased. Accordingly, the first portion is re-centered relative to the first body 202. Also, the flexible member 222 has returned to is non-flexed state with its portion 506 once again parallel to the first surface 118. In this orientation, the first and second portions can abut one another to create a nearly seamless display area as discussed above relative to FIGS. 1A-1C. However, without the flexible member 222 these abuting portions would tend to damage one another during rotation through the oblique angles of FIGS. 5A-5D and 6A-6D. Alternatively or additionally, without the flexible member 222 contact interference between the first and second portions can constrain further rotation (e.g., binding), which if the user applies more force to overcome could cause extensive damage to the device.

FIGS. 8A-8D show further rotation of the first and second portions 102 and 104 to a relative orientation of about 225 degrees. The rotation from the 180 degree orientation to the two hundred and twenty-five degree orientation occurred around hinge pin 206(1) rather than hinge pin 206(2) as defined by cams 216 and followers 214. Also note that once again region 502 of first surface 118 of the first portion 102 is contacting region 504 of second portion 104. Again, the contact can be mitigated by flexible member 222. Note that in the two hundred and twenty-five degree orientation the contact of the region 502 against the region 504 caused the flexible member 222 to flex from the planar configuration of the one hundred and eighty degree orientation to a flexed configuration. In the flexed configuration, at least portion 506 of the flexible member can transition from the non-flexed state. In this example, portion 506 is no longer parallel to first surface 118. Flexing of the flexible member has allowed hinge end 108 of the first portion 102 to move away from the hinge end 112 of the second portion 104 as indicated at 508. This is evidenced by the increasing spacing at 402 and the decreasing spacing at 404. Allowing the hinge ends of the first and second portions to move away from each other can lessen forces imparted on regions 502 and/or 504 and protect the first and second portions from damage.

FIGS. 9A-9D show additional relative rotation so that the first and second portions 102 and 104 are oriented at about 320 degrees to one another. At this point contact can occur between region 502 of the first portion 102 and region 504 of the second portion 104. However, flexible member 222 continues to allow the first portion 102 to move away from the second portion 104 as indicated at 508. This movement can decrease or limit forces between the first region 502 and the second region 504. This movement can be enabled by flexing at portion 506 of the flexible member 222.

FIGS. 10A-10D are similar to 4A-4D except the first portion 102 is now underneath the second portion 104 in what can be referred to as a three hundred and sixty degree relative angle. In this orientation, the second surface 120 of the first portion is positioned parallel and generally against the second surface 124 of the second portion. Further, the first surface 118 is once again parallel to the flexible member 222, which returns to the non-flexed state. Further, the first body 202 is once again generally centered relative to the first portion 102 (e.g., generally equal spacing at 402 and 404).

Individual elements of the determinative hinge assembly 106 can be made from various materials, such as metals, plastics, and/or composites. These materials can be prepared in various ways, such as in the form of sheet metals, die cast metals, machined metals, 3D printed materials, molded or 3D printed plastics, and/or molded or 3D printed composites, among others, or any combination of these materials and/or preparations can be employed.

The present determinative hinge assembly concepts can be utilized with any type of device, such as but not limited to notebook computers, tablets, smart phones, wearable smart devices, and/or other types of existing, developing, and/or yet to be developed devices.

Various methods of manufacture, assembly, and use for hinge assemblies and devices are contemplated beyond those shown above relative to FIGS. 1A-10D.

Various device examples are described above. Additional examples are described below. One example includes a device comprising a first portion and a second portion and further comprising a determinative hinge assembly that is secured to the second portion. The determinative hinge assembly further comprises a flexible member that is secured relative to the first portion. The flexible member is configured to flex when the first portion contacts the second portion at an oblique angle and to unflex when the first portion and the second portion are parallel to one another or perpendicular to one another.

Another example can include any of the above and/or below examples where the first portion comprises two planar parallel surfaces and where the flexible member is positioned between the two planar parallel surfaces.

Another example can include any of the above and/or below examples where the flexible member is planar and parallel to the two planar parallel surfaces when unflexed.

Another example can include any of the above and/or below examples where the flexible member is equidistant from the two planar surfaces when unflexed.

Another example can include any of the above and/or below examples where the flexible member is resiliently biased to the planar configuration.

Another example can include any of the above and/or below examples where at least a portion of the flexible member is not parallel to the two planar surfaces when flexed.

Another example can include any of the above and/or below examples where the flexible member is arcuate when flexed.

Another example can include any of the above and/or below examples where flexing of the flexible member allows the two parallel surfaces to move away from the second portion.

Another example can include any of the above and/or below examples where the device further comprises a first body positioned in the first portion and defining a first axis of rotation of the determinative hinge assembly.

Another example can include any of the above and/or below examples where the first body is only connected to the first portion via the flexible member.

Another example can include any of the above and/or below examples where a first end of the flexible member is secured to the first body and a second end of the flexible member is secured to the first portion.

Another example can include any of the above and/or below examples where the device further comprises a second body positioned in the second portion and defining a second axis of rotation of the determinative hinge assembly.

Another example can include any of the above and/or below examples where the first body defines a first cam and the second body defines a second cam.

Another example can include any of the above and/or below examples where interaction of the first cam and the second cam determine when rotation occurs around the first axis of rotation and when rotation occurs around the second axis of rotation.

Another example can include any of the above and/or below examples where the interaction of the first cam and the second cam is direct.

Another example can include any of the above and/or below examples where the interaction of the first cam and the second cam is accomplished via an interposed element.

Another example can include any of the above and/or below examples where the interposed element comprises a follower.

Another example can include any of the above and/or below examples where the flexible member allows a hinge end of the first portion to move away from a hinge end of the second portion at the oblique angles.

Another example can include a device comprising a first portion that includes a first display and a second portion that includes a second display. The device further comprises a determinative hinge assembly that is secured to the second portion. The determinative hinge assembly further comprises a flexible member that is secured relative to the first portion, the flexible member configured to flex when the first display contacts the second portion at an oblique angle during rotation of the first and second portions and to unflex when the first portion and the second portion are parallel to one another or perpendicular to one another.

Another example can include any of the above and/or below examples where the device further comprises a processor that controls the first and second displays and that creates separate graphical user interfaces on the first and second displays when the first and second displays are oriented at an oblique angle or right angle and creates a shared graphical user interface when the first and second displays are oriented at 180 degrees from one another.

Another example can include a device comprising a first portion that includes a first display and a second portion that includes a second display. The device further comprises a determinative hinge assembly that rotatably secures the first and second portions around first and second hinge axes and that has a first unflexed configuration when the first and second portions are parallel or perpendicular to one another and a second flexed configuration when the first and second portions contact one another when oriented at an oblique angle.

Another example can include any of the above and/or below examples where the determinative hinge assembly allows a range of rotation and where the determinative hinge assembly further controls that a first sub-range of rotation occurs around the first hinge axis and a second sub-range of rotation occurs around the second hinge axis.

Although techniques, methods, devices, systems, etc., pertaining to determinative hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device, comprising:
 a first portion and a second portion; and,
 a determinative hinge assembly that is secured to the second portion, and the determinative hinge assembly further comprises a flexible member that is positioned between two planar parallel surfaces of the first portion, the flexible member configured to flex responsive to the first portion contacting the second portion at an oblique angle and to unflex when the first portion and the second portion are parallel to one another.

2. The device of claim 1, wherein the flexible member has a planar configuration and is parallel to the two planar parallel surfaces when unflexed.

3. The device of claim 2, wherein the flexible member is equidistant from the two planar parallel surfaces when unflexed.

4. The device of claim 2, wherein the flexible member is resiliently biased to the planar configuration.

5. The device of claim 2, wherein at least a portion of the flexible member is not parallel to the two planar surfaces when flexed.

6. The device of claim 2, wherein the flexible member is arcuate when flexed.

7. The device of claim 2, wherein flexing of the flexible member allows the two planar parallel surfaces to move away from the second portion.

8. The device of claim 1, further comprising a first body positioned in the first portion and defining a first axis of rotation of the determinative hinge assembly.

9. The device of claim 8, wherein the first body is only connected to the first portion via the flexible member.

10. The device of claim 9, wherein a first end of the flexible member is secured to the first body and a second end of the flexible member is secured to the first portion.

11. The device of claim 8, further comprising a second body positioned in the second portion and defining a second axis of rotation of the determinative hinge assembly.

12. The device of claim 11, wherein the first body defines a first cam and the second body defines a second cam.

13. The device of claim 12, wherein interaction of the first cam and the second cam determine when rotation occurs around the first axis of rotation and when rotation occurs around the second axis of rotation.

14. The device of claim 13, wherein the interaction of the first cam and the second cam is accomplished via an interposed element.

15. The device of claim 1, wherein the flexible member allows a hinge end of the first portion to move away from a hinge end of the second portion at the oblique angles.

16. A device, comprising:
a first portion that includes a first display and a second portion that includes a second display; and,
a determinative hinge assembly that is secured to the second portion and the determinative hinge assembly further comprises a flexible member that is positioned between two planar parallel surfaces of the first portion, the flexible member configured to flex responsive to the first display contacting the second portion at an oblique angle during rotation of the first and second portions and to unflex when the first portion and the second portion are parallel to one another.

17. The device of claim 16, further comprising a processor that controls the first and second displays and that creates separate graphical user interfaces on the first and second displays when the first and second displays are oriented at an oblique angle or right angle and creates a shared graphical user interface when the first and second displays are oriented at 180 degrees from one another.

18. A device, comprising:
a first portion that includes a first display and a second portion that includes a second display; and,
a determinative hinge assembly that rotatably secures the first and second portions around first and second hinge axes and that has a first unflexed configuration when the first and second portions are parallel to one another and a second flexed configuration in response to the first and second portions contacting one another when oriented at an oblique angle.

19. The device of claim 18, wherein the determinative hinge assembly allows a range of rotation and wherein the determinative hinge assembly further controls that a first sub-range of rotation occurs around the first hinge axis and a second sub-range of rotation occurs around the second hinge axis.

* * * * *